(12) United States Patent
Saitoh

(10) Patent No.: US 10,876,588 B2
(45) Date of Patent: Dec. 29, 2020

(54) ELASTIC MECHANISM

(71) Applicant: NATIONAL UNIVERSITY CORPORATION SAITAMA UNIVERSITY, Saitama (JP)

(72) Inventor: Masato Saitoh, Saitama (JP)

(73) Assignee: NATIONAL UNIVERSITY CORPORATION SAITAMA UNIVERSITY, Saitama (JP)

( * ) Notice: Subject to any disclaimer, the term of this patent is extended or adjusted under 35 U.S.C. 154(b) by 35 days.

(21) Appl. No.: 15/757,413

(22) PCT Filed: Aug. 5, 2016

(86) PCT No.: PCT/JP2016/073113
§ 371 (c)(1),
(2) Date: Mar. 5, 2018

(87) PCT Pub. No.: WO2017/043230
PCT Pub. Date: Mar. 16, 2017

(65) Prior Publication Data
US 2019/0024746 A1    Jan. 24, 2019

(30) Foreign Application Priority Data

Sep. 7, 2015  (JP) ................................ 2015-175377

(51) Int. Cl.
*F16F 3/04* (2006.01)
*F16F 15/04* (2006.01)
(Continued)

(52) U.S. Cl.
CPC ................ *F16F 3/04* (2013.01); *F16F 15/04* (2013.01); *F16F 15/067* (2013.01); *F16F 1/041* (2013.01);
(Continued)

(58) Field of Classification Search
CPC .... F16F 3/04; F16F 1/121; F16F 1/041; F16F 15/067; F16F 2236/06; F16F 2236/04; F16F 2236/12; E04H 9/021
See application file for complete search history.

(56) References Cited

U.S. PATENT DOCUMENTS

| | | | |
|---|---|---|---|
| 1,528,613 A | 3/1925 | Hill | |
| 1,674,548 A * | 6/1928 | Hegenberger | F16F 3/04 267/255 |
| 2,480,864 A | 9/1949 | Loepsinger | |
| 2,615,708 A * | 10/1952 | Rouverol | F16F 3/04 267/173 |

(Continued)

FOREIGN PATENT DOCUMENTS

| | | |
|---|---|---|
| JP | 2006-55494 A | 3/2006 |
| JP | 2015-113977 A | 6/2015 |

OTHER PUBLICATIONS

International Search Report dated Sep. 20, 2016, issued in counterpart application No. PCT/JP2016/073113. (1 page).
(Continued)

*Primary Examiner* — Xuan Lan Nguyen
(74) *Attorney, Agent, or Firm* — Westerman, Hattori, Daniels & Adrian, LLP

(57) ABSTRACT

In the spring mechanism, the negative spring mechanism biasing the loading plate to the positive side in the z-direction has the spring shaft and interspring. The spring shaft is rotatably connected to the fixed part and is connected through the slider with respect to the loading plate so that it can rotate and can move in the x-direction. The connection part with the loading plate is positioned on the positive side in the z-direction and on the positive side in the x-direction relative to the connection part with the fixed part. An elastic force countering the compression is generated by the spring shaft. The interspring is connected to the loading plate and is connected through the slider to the spring shaft. It generates an elastic force countering the displacement to the
(Continued)

positive side in the x-direction of the connection part of the spring shaft with the loading plate.

6 Claims, 10 Drawing Sheets

(51) Int. Cl.
*F16F 15/067* (2006.01)
*F16F 3/02* (2006.01)
*F16F 1/04* (2006.01)
*F16F 1/12* (2006.01)

(52) U.S. Cl.
CPC ............... *F16F 1/121* (2013.01); *F16F 3/026* (2013.01); *F16F 2236/04* (2013.01); *F16F 2236/06* (2013.01)

(56) References Cited

U.S. PATENT DOCUMENTS

| | | | | |
|---|---|---|---|---|
| 2,861,768 | A | * | 11/1958 | Roccati ..................... F16F 3/04 248/614 |
| 2,877,011 | A | | 3/1959 | Hrebicek |
| 3,586,271 | A | * | 6/1971 | Sloyan .................. F16F 15/067 248/652 |
| 2015/0000217 | A1 | * | 1/2015 | Sarlis ...................... E04H 9/021 52/167.2 |
| 2015/0159720 | A1 | | 6/2015 | Ko |

OTHER PUBLICATIONS

Extended (Supplementary) European Search Report dated May 14, 2019, issued in counterpart EP application 16844094.9. (9 pages).

* cited by examiner

ELASTIC MECHANISM

TECHNICAL FIELD

The present invention relates to an elastic mechanism including a spring, rubber, etc.

BACKGROUND ART

As the elastic mechanism, for example there is known a constant load spring mechanism (for example Patent Literature 1). In the constant load spring mechanism in Patent Literature 1, a spring having a positive spring constant and a spring mechanism having a negative spring constant are combined so that both of their elastic forces are oriented vertically upward. Accordingly, if the elastic force of the spring having a positive spring constant increases or decreases, conversely the elastic force of the spring having a negative spring constant decreases or increases. As a result, it becomes possible to generate an elastic force upward with a constant magnitude without depending on displacement in the vertical direction. Further, the spring mechanism having a negative spring constant in Patent Literature 1 has a spring having a positive spring constant (this is a spring different from the spring which has a positive spring constant explained before) and a link mechanism connected to this spring. The component of the elastic force in the vertical direction is increased/decreased according to the change of orientations of the spring and linkage thereby realizing a negative spring constant.

CITATION LIST

Patent Literature

Patent Literature 1: Japanese Patent Publication No. 2006-55494A

SUMMARY OF INVENTION

Technical Problem

A constant load spring mechanism such as described above or a spring mechanism having a negative spring constant has various inconveniences. For example, there can be mentioned inconveniences such that a small allowable displacement, difficulty in suitably changing the spring constant, and so on. Therefore, preferably there is provided an elastic mechanism based on a new principle which may be able to solve at least one of such inconveniences.

Solution to Problem

A spring mechanism according to one aspect of the present invention includes a fixed part, a movable part movable in a predetermined main direction relative to the fixed part, and a negative elastic mechanism which generates an elastic force biasing the movable part to a first side in the main direction relative to the fixed part and increasing the elastic force along with displacement of the movable part to the first side in the main direction. The negative elastic mechanism includes a negative side main elastic part which generates an elastic force biasing the movable part relative to the fixed part and a negative side sub elastic part which generates an elastic force biasing the negative side main elastic part relative to the movable part in a first sub-direction crossing the main direction. The negative side main elastic part is connected with respect to the fixed part so that it can rotate around an axis parallel to a first rotational axis direction perpendicular to the main direction and to the first sub-direction, is connected with respect to the movable part so that it can move in the first sub-direction and can rotate around an axis parallel to the first rotational axis direction, includes the connection part with the movable part located on the first side in the main direction and on a second side in the first sub-direction relative to the connection part with the fixed part, and has a positive spring characteristic generating an elastic force countering compression between the connection part with the fixed part and the connection part with the movable part. The negative side sub elastic part is connected to the movable part, is connected to the connection part of the negative side main elastic part with the movable part, and has a positive spring characteristic generating an elastic force countering displacement of the connection part of the negative side main elastic part with the movable part to the second side in the first sub-direction.

Preferably, the spring mechanism further includes a positive elastic mechanism which biases the movable part to the first side in the main direction relative to the fixed part and decreases the elastic force along with the displacement of the movable part to the first side in the main direction. The positive elastic mechanism includes a positive side main elastic part which generates an elastic force biasing the movable part relative to the fixed part and a positive side sub elastic part which generates an elastic force biasing the positive side main elastic part relative to the movable part in a second sub-direction crossing the main direction. The positive side main elastic part includes a portion connected with respect to the fixed part and reaching the movable part from a predetermined position of the fixed part, is connected with respect to the movable part so that it can move in the second sub-direction and can rotate around an axis parallel to the second rotational axis direction, includes the connection part with the movable part located on the opposite side to the first side in the main direction and on a third side in the second sub-direction relative to the predetermined position of the fixed part, and has a positive spring characteristic generating an elastic force countering tension between the predetermined position of the fixed part and the connection part with the movable part. The positive side sub elastic part is connected to the movable part, is connected to the connection part of the positive side elastic part with the movable part, and has a positive spring characteristic generating an elastic force countering displacement of the connection part of the positive side main elastic part with the movable part to the opposite side to the third side in the second sub-direction.

Preferably, the spring mechanism further includes a negative side main elastic part position adjustment mechanism capable of adjusting the position of the connection part of the negative side main elastic part with the fixed part at the fixed part in the main direction.

Preferably, the spring mechanism further includes a negative side sub elastic part position adjustment mechanism capable of adjusting the position of the connection part of the negative side sub elastic part with the movable part at the movable part in a direction of the elastic force of the negative side sub elastic part.

Preferably, the first sub-direction is perpendicular to the main direction. $K_f = k_S \times \Delta l_0 / l_c$ and $\Delta l_f = l_c \times \cos \theta_c$ stand under the following definitions. The spring constant of the negative side main elastic part is $k_S$. The spring constant of the negative side sub elastic part is $K_f$. In a state where the elastic force in the first sub-direction of the negative side main elastic part and the elastic force in the first sub-direction of the negative side sub elastic part are balanced, in the negative side main elastic part, the length from the connection part with the fixed part to the connection part with the movable part is $l_c$, contraction from a state not generating an elastic force is $\Delta l_0$, and an inclination angle from the first sub-direction of the direction from the connection part with the fixed part to the connection part with the movable part is $\theta_c$, and an amount of deformation of the negative side sub elastic part from the state not generating an elastic force is $\Delta l_f$.

Preferably, the second sub-direction is perpendicular to the main direction. $K_{Pf}=k_{PS}\times\Delta l_{P0}/l_{Pc}$, $\Delta l_{Pf}=l_{Pc}\times\cos\theta_{Pc}$, and $k_{PS}\times\Delta l_{P0}/l_{Pc}=k_S\times\Delta l_0/l_c$ stand under the following definitions. The spring constant of the positive side main elastic part is $k_{PS}$. The spring constant of the positive side sub elastic part is $K_{Pf}$. In a state where the elastic force in the second sub-direction of the positive side main elastic part and the elastic force in the second sub-direction of the positive side sub elastic part are balanced, in the positive side main elastic part, the length from the predetermined position of the fixed part to the connection part of with the movable part is $l_{Pc}$, an elongation from a state not generating an elastic force is $\Delta l_{P0}$, and an inclination angle from the second sub-direction of a direction from the connection part with the fixed part to the connection part with the movable part is $\theta_{Pc}$, and an amount of deformation of the positive side sub elastic part from the state not generating an elastic force is $\Delta l_{Pf}$.

Preferably, the second sub-direction is perpendicular to the main direction. $K_{Pf}=k_{PS}\times\Delta l_{P0}/l_{Pc}$, $\Delta l_{Pf}=l_{Pc}\times\cos\theta_{Pc}$, and $k_{PS}\times\Delta l_{P0}/l_{Pc}\neq k_S\times\Delta l_0/l_c$ stand under the following definitions. The spring constant of the positive side main elastic part is $k_{PS}$. The spring constant of the positive side sub elastic part is $K_{Pf}$. In a state where the elastic force in the second sub-direction of the positive side main elastic part and the elastic force in the second sub-direction of the positive side sub elastic part are balanced, in the positive side main elastic part, the length from the predetermined position of the fixed part to the connection part with the movable part is $l_{Pc}$, an elongation from a state not generating an elastic force is $\Delta l_{P0}$ and an inclination angle from the second sub-direction of a direction from the connection part with the fixed part to the connection part with the movable part is $\theta_{Pc}$, and an amount of deformation of the positive side sub elastic part from the state not generating an elastic force is $\Delta l_{Pf}$.

Preferably, the spring mechanism further includes a positive elastic mechanism which biases the movable part to the opposite side to the first side in the main direction relative to the fixed part, and decreases the elastic force along with a displacement of the movable part to the opposite side to the first side in the main direction. The positive elastic mechanism includes a positive side main elastic part which generates an elastic force of biasing the movable part relative to the fixed part and a positive side sub elastic part which generates an elastic force of biasing in a second sub-direction crossing the main direction. The positive side main elastic part includes a portion connected with respect to the fixed part and reaching the movable part from a predetermined position in the fixed part, is connected with respect to the movable part so that it can move in the second sub-direction and can rotate around an axis parallel to the second rotational axis direction, includes the connection part with the movable part located on the first side in the main direction and on a third side in the second sub-direction relative to the predetermined position of the fixed part, and has a positive spring characteristic generating an elastic force countering tension between the predetermined position of the fixed part and the connection part with the movable part. The positive side sub elastic part is connected to the movable part, is connected to the connection part of the positive side main elastic part with the movable part, and has a positive spring characteristic generating an elastic force countering displacement of the connection part of the positive side main elastic part with the movable part to the opposite side to the third side in the second sub-direction.

A spring mechanism according to another aspect of the present invention includes a fixed part, a movable part movable in a predetermined main direction relative to the fixed part, and a positive elastic mechanism which generates an elastic force biasing the movable part to a first side in the main direction relative to the fixed part and decreasing the elastic force along with displacement of the movable part to the first side in the main direction. The positive elastic mechanism includes a positive side main elastic part which generates an elastic force biasing the movable part relative to the fixed part and a positive side sub elastic part which generates an elastic force biasing the positive side main elastic part relative to the movable part in a second sub-direction crossing the main direction. The positive side main elastic part includes a portion connected with respect to the fixed part and reaching the movable part from a predetermined position in the fixed part, is connected with respect to the movable part so that it can move in the second sub-direction and can rotate around an axis parallel to the second rotational axis direction, includes the connection part with the movable part located on the opposite side to the first side in the main direction and on a third side in the second sub-direction relative to the predetermined position of the fixed part, and has a positive spring characteristic generating an elastic force countering tension between the predetermined position of the fixed part and the connection part with the movable part. The positive side sub elastic part is connected to the movable part, is connected to the connection part of the positive side main elastic part with the movable part, and has a positive spring characteristic generating an elastic force countering displacement of the connection part of the positive side main elastic part with the movable part to the opposite side to the third side in the second sub-direction.

Preferably, the positive side main elastic part is connected to the predetermined position of the fixed part, and a positive side main elastic part position adjustment mechanism capable of adjusting the position of the predetermined position to which the positive side main elastic part is connected at the fixed part in the main direction is provided.

Preferably, the mechanism further includes a positive side sub elastic part position adjustment mechanism capable of adjusting the position of the connection part of the positive side sub elastic part with the movable part at the movable part in a direction of the elastic force of the negative side sub elastic part.

Preferably, the mechanism further includes a rotation member which can rotate around a third rotational axis perpendicular to the main direction and to which displacement in the main direction of the movable part is transmitted at a position distant from the third rotational axis.

Advantageous Effects of Invention

According to the above configurations, for example, it is possible to make the allowable displacement larger or change the spring constant.

DESCRIPTION OF EMBODIMENTS (Principle of Spring Mechanism According to Embodiments)

Figure 1:
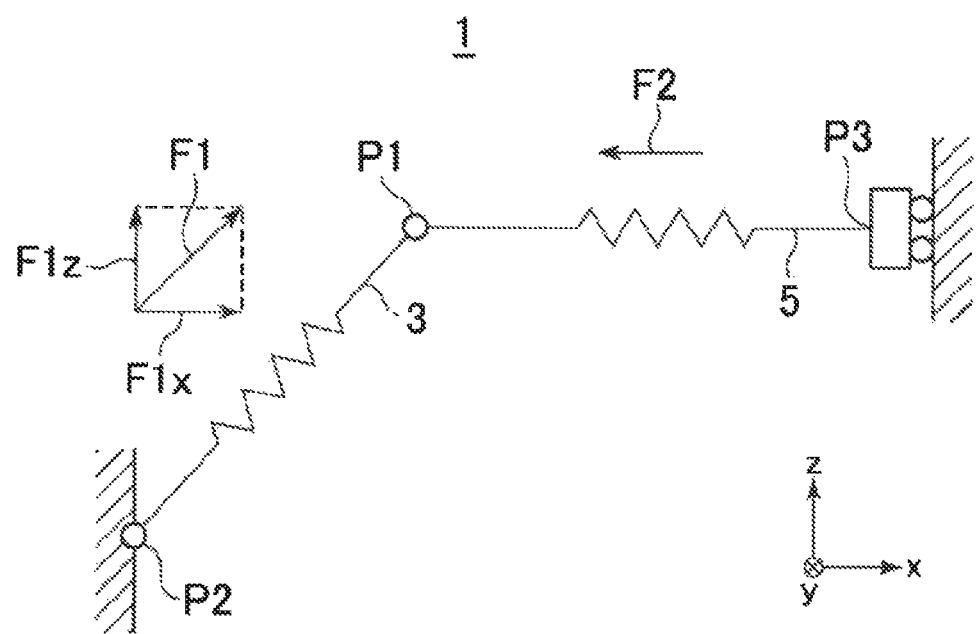
FIG. 1 A schematic view for explaining the principle of a spring mechanism according to an embodiment of the present invention.

FIG. 1 is a schematic view for explaining the principle of a spring mechanism according to an embodiment.

A shown spring mechanism 1 has a main spring 3 inclined in a z-direction and a sub spring 5 parallel to an x-direction. Both of the main spring 3 and the sub spring 5 are compression springs and are connected to each other at the center side (point P1). Movement of the two ends (point P2 and P3) in the x-direction is restricted in a compressed state. At this time, the elastic forces of the main spring 3 and sub spring 5 are balanced in the x-direction.

Specifically, first, the main spring 3 is arranged with an inclination relative to the z-direction and generates a force F1 parallel to its longitudinal direction. This force F1 can be considered divided into a force F1$x$ as the component (force component) parallel to the x-direction and a force F1$z$ as the component (force component) parallel to the z-direction. Further, the sub spring 5 is arranged parallel to the x-direction and generates a force F2 which is parallel to the longitudinal direction of the sub spring 5 (that is, the x-direction). Further, the force F1$x$ and the force F2 become the same magnitude.

On the other hand, looking at the force F1$z$ of the main spring 3, a force which is balanced with this is not generated in the spring mechanism 1, so this force F1$z$ becomes a force biasing the point P1 to the positive side in the z-direction. This force F1$z$ is a so-called "unbalanced force" of the main spring 3 and the sub spring 5. The present application proposes a spring mechanism utilizing this unbalanced force.

In the spring mechanism 1 utilizing this unbalanced force, as will be explained in detail later, for example, a preferred negative spring mechanism can be obtained. Further, for example, it is possible to adjust the position of the point P2 in the z-direction etc. to adjust the magnitude of the unbalanced force F1$z$ and consequently change the spring constant of the spring mechanism 1.

Note that, in FIG. 1, the explanation was given taking as an example a case where both of the main spring 3 and the sub spring 5 were compression springs. However, as will be apparent from the embodiments which will be explained later, one or both of the main spring 3 and the sub spring 5 may be tension springs as well so far as they are arranged and connected so as to generate elastic forces which are oriented inverse to each other in the x-direction.

First Embodiment (Schematic Configuration)

Figure 2A:
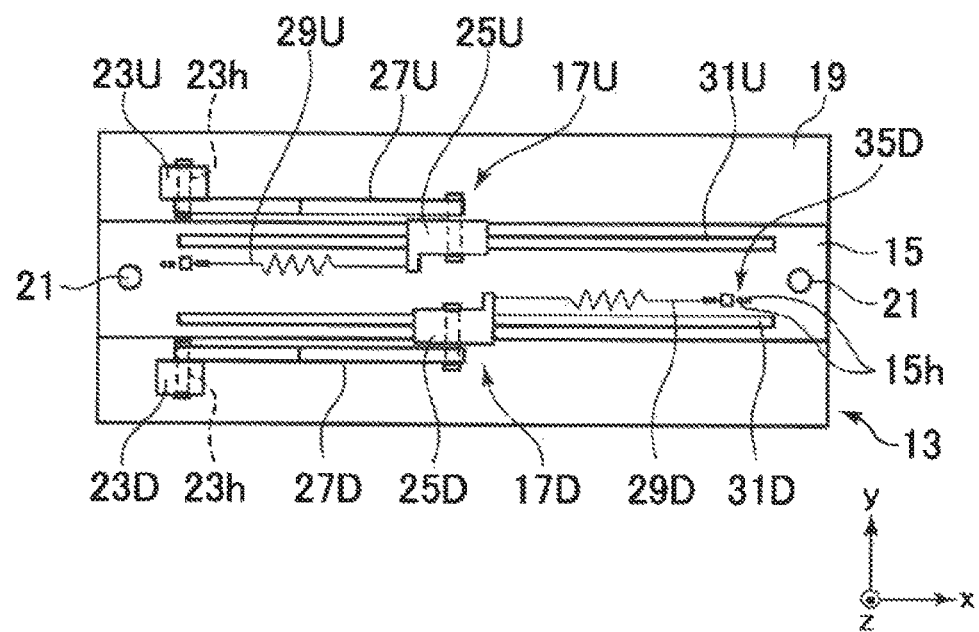
FIG. 2A and FIG. 2B are a plan view and side view showing the configuration of a constant load spring mechanism according to a first embodiment.
Figure 2B:
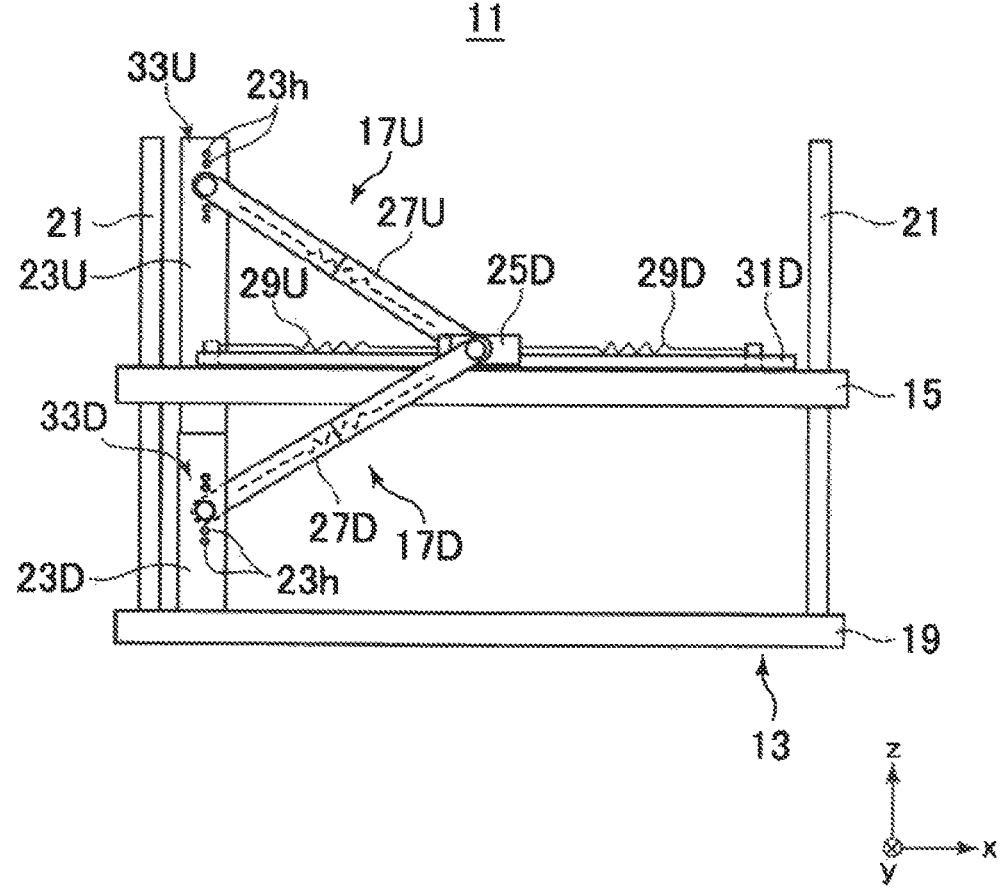

FIG. 2A is a plan view showing the configuration of a spring mechanism 11 according to a first embodiment. FIG. 2B is a side view showing the spring mechanism 11.

Note that, in the spring mechanism 11, any direction may be defined as the vertical direction or horizontal direction. However, for convenience, the explanation will be sometimes given defining the positive side in the z-direction as the upper part. This same is true also in the other embodiments.

The spring mechanism 11, for example, has a fixed part 13 and a loading plate 15 movable in the z-direction relative to the fixed part 13 and is configured as a constant load spring mechanism biasing the loading plate 15 upward. Further, the spring mechanism 11 is configured as a constant load spring mechanism by providing a negative spring mechanism 17D having a negative spring characteristic and a positive spring mechanism 17U having a positive spring characteristic.

Note that, in the following explanation, sometimes "D" will be attached to a configuration concerning the negative spring mechanism 17D, and "U" will be attached to a configuration concerning the positive spring mechanism 17U. Further, sometimes "D" or "U" will be suitably omitted to not differentiate between configurations concerning the spring mechanisms 17.

The fixed part 13 for example has a base 19 which becomes the base member, a vertical guide 21 for guiding the loading plate 15 in the z-direction, and columns 23D and 23U contributing to attachment of the negative spring mechanism 17D and positive spring mechanism 17U.

The base 19 is for example a plate shape facing the z-direction. The vertical guides 21 are for example shaft-shaped members which are fixed to the base 19 and extend parallel to the z-direction. The loading plate 15 is for example a plate-shaped member which is arranged so as to face the base 19 and through which the vertical guide 21 is inserted. Due to this, the loading plate 15 is restricted in movement along the xy plane relative to the fixed part 13 and is allowed in movement in the z-direction. Note that, the arrangement and number etc. of the vertical guides 21 may be suitably set. In the illustrated example, the vertical guides 21 are arranged at the two sides in the loading plate 15 in the x-direction.

The columns 23D and 23U are fixed to the base 19 and extend in the z-direction. The columns 23U and 23D are for example arranged on the same side of the loading plate 15 in the x-direction. The heights of the columns 23U and 23D may be the same. In the illustrated example, however, the column 23D is made shorter than the column 23U. As will be explained later, this corresponds to the position of connection of the negative spring mechanism 17D with respect to the column 23D being lower than the position of connection of the positive spring mechanism 17U with respect to the column 23U.

The negative spring mechanism 17D generates an elastic force biasing the loading plate 15 to the positive side in the z-direction. This elastic force becomes larger as the loading plate 15 displaces more to the positive side in the z-direction. In this way, in the negative spring characteristic, the direction of the elastic force and the direction of the displacement when the elastic force increases are the same.

The positive spring mechanism 17U generates an elastic force biasing the loading plate 15 to the positive side in the z-direction. This elastic force becomes larger as the loading plate 15 displaces more to the negative side in the z-direction. In this way, in the positive spring characteristic, the direction of the elastic force and the direction of the displacement when the elastic force increases are inverse.

When such a negative spring mechanism 17D and positive spring mechanism 17U are combined, when the loading plate 15 moves to the positive side or negative side in the z-direction, the amount of increase/decrease of the elastic force of the negative spring mechanism 17D and the amount of increase/decrease of the elastic force of the positive spring mechanism 17U are cancelled out by each other. As a result, as a whole, a constant elastic force is applied to the loading plate 15.

(Configuration of Negative Spring Mechanism)

The negative spring mechanism 17D has a slider 25D corresponding to the point P1 in FIG. 1, a spring shaft 27D corresponding to the main spring 3 in FIG. 1, and an interspring 29D corresponding to the sub spring 5 in FIG. 1. The spring shaft 27D and the interspring 29D are balanced in the x-direction and generate an unbalanced force to the positive side in the z-direction. By this unbalanced force, the negative spring mechanism 17D biases the loading plate 15 to the positive side in the z-direction. Specifically, this is as follows.

The slider 25D is for example restricted in movement relative to the loading plate 15 in the yz plane and is allowed in movement in the x-direction. For example, the slider 25D is guided in the x-direction by a slide guide 31D (linear guide) which is fixed to the loading plate 15 and extends in the x-direction. The shape etc. of the slider 25D may be suitably set.

Although no notation is particularly attached, the spring shaft 27D is for example configured by including two shaft-shaped members allowed only relative movement in the axial direction and a compression spring (indicated by a broken line in FIG. 2B) compressed by the relative movement of the two shaft-shaped members shortening the overall length of these two shaft-shaped members. The compression spring has a positive spring constant. Accordingly, the spring shaft 27D functions as a compression spring generating an elastic force resistant against compression strain between the two ends thereof while increasing the elastic force according to the compression strain (that is, having a positive spring constant). Note that, the two shaft-shaped members contribute to for example suppression of bending deformation of the compression spring.

One end of the spring shaft 27D is connected to the slider 25D, while the other end is connected to the column 23D. This connection is carried out so that for example the spring shaft 27D becomes parallel to the xz plane. The spring shaft 27D is inclined so that the end part on the slider 25D side is positioned on the positive side in the z-direction and on the positive side in the x-direction relative to the end part on the column 23D side. This inclination is influenced by balancing with the interspring 29D as will be explained later. Note that, the range of movement of the slider 25D and/or loading plate 15 may be restricted as well so that the spring shaft 27D will not be inclined to an inverse side to the shown inclination relative to the z-direction or x-direction.

The spring shaft 27D and the slider 25D are connected so that they can relatively rotate around an axis parallel to the y-direction. In the same way, the spring shaft 27D and the column 23D are connected so that they can relatively rotate around an axis parallel to the y-direction. Accordingly, for example, along with movement of the slider 25D in the x-direction and/or movement of the loading plate 15 (slider 25D) in the z-direction, the spring shaft 27D is allowed to contract or expand (however, also an aspect without expansion will be explained in the present embodiment), while can change in inclination relative to the x-direction (z-direction from another viewpoint).

The position of the connection part of the spring shaft 27D with the column 23D at the column 23D can be changed in the z-direction. For example, in the column 23D, a plurality of holes 23h (FIG. 2B) are formed aligned in the z-direction. It is possible to select from among the plurality of holes 23h the position of insertion in the column 23D of a shaft member (notation is omitted) supporting the spring shaft 27D so as to change the connection position of the spring shaft 27D. Note that, such a configuration of the column 23D etc. forms a position adjustment mechanism 33D (FIG. 2B).

The interspring 29D is for example a compression spring having a positive spring constant. For example, the interspring 29D is a helical spring which generates an elastic force increasing according to the compression strain between its two ends and countering the compression strain. Note that, so as to suppress buckling of the interspring 29D, a plurality of shaft-shaped members expanding and contracting like the spring shaft 27D may be provided as well.

One end of the interspring 29D is connected to the slider 25D, while the other end is connected to the loading plate 15. They are connected for example so that, in the x-direction, the interspring 29D is positioned on the opposite side to the spring shaft 27D across the slider 25D. Further, they are connected so that the interspring 29D becomes parallel to the x-direction (direction of movement of the slider 25D).

Accordingly, in the illustrated example, the force component of the interspring 27D to the positive side in the x-direction and the force of the interspring 29D to the negative side in the x-direction act upon the slider 25D. That is, these forces act upon the slider 25D in inverse directions to each other. Further, the slider 25D stops at the position in the x-direction at which these forces are balanced. Further, the force component of the interspring 27D to the positive side in the z-direction becomes the elastic force biasing the loading plate 15 to the positive side in the z-direction.

The position of the connection part of the interspring 29D with the loading plate 15 at the loading plate 15 can be changed in the x-direction. For example, in the loading plate 15, a plurality of holes 15h (FIG. 2A) are formed aligned in the x-direction. It is possible to select from among the plurality of holes 15h the position of insertion in the loading plate 15 by a jig (notation is omitted) fixed to the end part of the interspring 29D so as to change the connection position of the interspring 29D. Note that, such a configuration forms a position adjustment mechanism 35D (FIG. 2A).

(Configuration of Positive Spring Mechanism)

The positive spring mechanism 17U, in the same way as the negative spring mechanism 17D, utilizes the unbalanced force in FIG. 1. The components are substantially the same as those of the negative spring mechanism 17D. However, the positive spring mechanism 17U utilizes a tension spring and is different from the negative spring mechanism 17D in orientations and positions of the elements. Specifically, this is as follows.

The positive spring mechanism 17U has a slider 25U (FIG. 2A) corresponding to the point P1 in FIG. 1, a spring shaft 27U corresponding to the main spring 3 in FIG. 1, and an interspring 29U corresponding to the sub spring 5 in FIG. 1. The spring shaft 27U and the interspring 29U are balanced in the x-direction and generate an unbalanced force to the positive side in the z-direction. By this unbalanced force, the positive spring mechanism 27U biases the loading plate 15 to the positive side in the z-direction.

The slider 25U is the same as the slider 25D. By a slide guide 31U, movement parallel to the yz plane relative to the loading plate 15 is restricted, and the movement in the x-direction is allowed. Note that, the slide guide 31U is for example arranged parallel to the slide guide 31D.

The spring shaft 27U, for example, in the same way as the spring shaft 27D, has two shaft members and a spring (indicated by a broken line in FIG. 2B) having a positive spring constant which generates an elastic force in accordance with the expansion/contraction of these two shaft members as a whole. However, the spring used in the spring shaft 27U is a tension spring unlike the spring used in the spring shaft 27D. That is, the tension spring is stretched by relative movement of the two shaft-shaped members which make the two shaft-shaped members as a whole extend to generate an elastic force. Consequently, the spring shaft 27U functions as a tension spring generating an elastic force increasing according to the tensile strain between its two ends and countering the tensile strain (that is, having a positive spring constant).

The spring shaft 27U, in the same way as the spring shaft 27D, is for example connected at one end to the slider 25U and connected in the other end to the column 23U so as to become parallel to the xz plane. However, the spring shaft 27U, contrary to the spring shaft 27D, is inclined so that the end part on the slider 25U side is positioned on the negative side in the z-direction and on the positive side in the x-direction relative to the end part on the column 23U side. That is, in the spring shaft 27U, the direction from the connection part with the column 23U to the connection part with the slider 25U is inverse to that in the spring shaft 27D in the z-direction. Due to this, the tensile force of the spring shaft 27U and the compression force of the spring shaft 27D are directed to the same side in the z-direction (the positive side in the illustrated example). Note that, in the same way as the negative spring mechanism 17D, the inclination of the spring shaft 27U is influenced by balance with the interspring 29U. Further, the movement of various types of members may be suitably restricted as well so as not to incline to the inverse side to the shown inclination relative to the z-direction or x-direction.

The connection between the spring shaft 27U and the slider 25U and the connection between the spring shaft 27U and the column 23U are the same as the connections in the negative spring mechanism 27D. That is, each of these connections is made so that the members can relatively rotate around an axis parallel to the y-direction. Further, the position of the connection part of the spring shaft 27U with the column 23U at the column 23U can be changed in the z-direction (a position adjustment mechanism 33U (FIG. 2B) is provided).

The interspring 29U is for example a compression spring having a positive spring constant in the same way as the interspring 29D and is connected to the slider 25U and the loading plate 15 so as to be parallel to the x-direction. However, the interspring 29U, unlike the interspring 29D, is arranged on the same side as the spring shaft 27U relative to the slider 25U. This corresponds to the fact that the spring shaft 27U functions as a tension spring unlike the spring shaft 27D.

That is, by arrangement as described above, in the illustrated example, the force component of the spring shaft 27U to the negative side in the x-direction and the force of the interspring 29U to the positive side in the x-direction act with respect to the slider 25U in orientations inverse to each other. Further, the slider 25U stops at the position in the x-direction at which these forces are balanced. Further, the force component of the spring shaft 27U to the positive side in the z-direction becomes the elastic force biasing the loading plate 15 to the positive side in the z-direction.

Note that, the position of the connection part of the interspring 29U with the loading plate 15 at the loading plate 15 can be changed in the x-direction (a position adjustment mechanism 35U (FIG. 2A) is provided) in the same way as the interspring 29D.

(Characteristics of Negative Spring Mechanism)

The negative spring mechanism 17D is based on the new principle of utilizing the unbalanced force explained with reference to FIG. 1. However, the characteristics of the negative spring mechanism 17D will be explained here by utilizing the thinking in the related art.

First, in the negative spring mechanism 17D, assume that the slider 25D and the interspring 29D are not provided. That is, assume that the end part of the spring shaft 27D on the loading plate 15 side is connected with the loading plate 15 so that it can rotate around the y-axis and cannot move in the x-direction.

In this case, when the loading plate 15 moves to the positive side in the z-direction, the spring shaft 27D extends and the elastic force in the longitudinal direction (F1 in FIG. 1) decreases. On the other hand, the inclination of the spring shaft 27D relative to the z-direction becomes small, therefore the ratio of the force component in the z-direction ($F1z$ in FIG. 1) in the elastic force in the longitudinal direction of the spring shaft 27D increases. Accordingly, if the degree of increase of the force component due to the change of inclination exceeds the degree of reduction of the elastic force due to the extension, the elastic force to the positive side in the z-direction ends up increasing according to the displacement to the positive side in the z-direction. That is, a negative spring characteristic is realized. This is the basic principle in the conventional negative spring mechanism.

For the force component in the x-direction ($F1x$ in FIG. 1) of the spring shaft 27D, if the loading plate 15 moves to the positive side in the z-direction and the inclination of the spring shaft 27D relative to the z-direction becomes small (if the inclination relative to the x-direction becomes large), the ratio in the elastic force (F1) is reduced. Accordingly, the force component in the x-direction ($F1x$) is reduced by synergy of the reduction of the elastic force (F1) in the longitudinal direction of the spring shaft 27D itself and the reduction of the ratio of the force component due to the change of inclination.

Next, consider a case where the slider 25D and interspring 29D are provided as in the present embodiment.

When the loading plate 15 (slider 25D) moves to the positive side in the z-direction, as explained above, the force component ($F1x$) in the x-direction of the spring shaft 27D is reduced. Due to this, the slider 25D biased to the negative side in the x-direction by the interspring 29D moves to the negative side in the x-direction.

According to the movement of the slider 25D to the negative side in the x-direction, the extension of the spring shaft 27D is suppressed, or the spring shaft 27D is shortened. Accordingly, the elastic force (F1) in the longitudinal direction of the spring shaft 27D is kept from decreasing or increases. Further, the inclination of the spring shaft 27D relative to the z-direction becomes small. As a result, compared with the case where the interspring 29D is not provided, the force component in the z-direction (F1z) increases.

In this way, by provision of the interspring 29D, the reduction of the elastic force in longitudinal direction of the spring shaft 27D is suppressed or the reduction of inclination relative to the z-direction is promoted. As a result, for example, in a case where the influence of the spring shaft 27D relative to the z-direction is relatively small, when the loading plate 15 moves to the positive side in the z-direction, the relative increase of the amount of reduction of the elastic force due to the extension of the spring shaft 27D is suppressed, and consequently a loss of the function as the negative spring is suppressed. That is, the range where it functions as the negative spring characteristic becomes long.

Note that, from another viewpoint, in the negative spring mechanism 17D in the present embodiment, the end part on the loading plate 15 side can move not only in the z-direction, but also in a direction crossing this (x-direction), therefore motion having two degrees of freedom has become possible. Due to this, it becomes possible to control the expansion and contraction of the spring shaft 27D without relying on the inclination of the spring shaft 27D alone, therefore the effects as described above are exhibited.

(Characteristics of Positive Spring Mechanism)

Regarding the spring characteristic of the positive spring mechanism 17U as well, in the same way as the negative spring mechanism 17D, for convenience, the explanation will be given by utilizing the thinking of the related art.

First, in the positive spring mechanism 17D, assume that the slider 25U and interspring 29U are not provided. That is, assume that the end part of the spring shaft 27U on loading plate 15 side is connected with the loading plate 15 so that it can rotate around the y-axis and cannot move in the x-direction.

In this case, when the loading plate 15 moves to the negative side in the z-direction, the spring shaft 27U extends, therefore the elastic force in the longitudinal direction increases. On the other hand, the inclination of the spring shaft 27U relative to the z-direction becomes small, therefore the ratio of the force component in the z-direction in the elastic force in the longitudinal direction of the spring shaft 27U increases. Accordingly, by synergy of the increase of elastic force due to the extension and the increase of the force component due to the change of inclination, the elastic force to the positive side in the z-direction increases. That is, the positive spring characteristic is maintained.

For the force component in the x-direction of the spring shaft 27U, if the loading plate 15 moves to the negative side in the z-direction and the inclination of the spring shaft 27U relative to the z-direction becomes small (if the inclination relative to the x-direction becomes large), the ratio in the elastic force is reduced. Accordingly, the force component in the x-direction of the spring shaft 27U increases if the degree of increase of elastic force in the longitudinal direction of the spring shaft 27U is relatively large relative to the degree of reduction of the ratio of the force component in the x-direction due to the change of inclination. Conversely, it is reduced if the former is relatively small compared with the latter.

Next, consider a case where the slider 25U and interspring 29U are provided as in the present embodiment.

First, consider the case where when the loading plate 15 (slider 25U) moves to the negative side in the z-direction, the degree of increase of the elastic force in the longitudinal direction of the spring shaft 27U is relatively large compared with the degree of reduction of the ratio of the force component in the x-direction due to the change of inclination. That is, consider the case where the force component to the negative side in the x-direction consequently increases. In this case, from another viewpoint, the degree of increase of the ratio of the force component in the z-direction due to the change of inclination is relatively large. If the force component to the negative side in the x-direction consequently increases and the slider 25U moves to the negative side in the x-direction, the spring shaft 27U is suppressed in elongation and is promoted in the reduction of inclination relative to the z-direction. As a result, in the force component in the z-direction, the increase due to the increase of elongation is suppressed, while the increase due to the reduction of inclination relative to the z-direction is promoted.

Next, consider the case where when the loading plate 15 moves to the negative side in the z-direction, the degree of increase of the elastic force in the longitudinal direction of the spring shaft 27U is relatively small compared with the degree of reduction of the ratio of the force component in the x-direction due to the change of inclination. That is, consider the case where the force component to the negative side in the x-direction is consequently reduced. In this case, from another viewpoint, the degree of increase of the ratio of the force component in the z-direction due to the change of inclination is relatively small. If the force component to the negative side in the x-direction is consequently reduced and the slider 25U moves to the positive side in the x-direction, the spring shaft 27U is promoted in extension and is suppressed in reduction of inclination relative to the z-direction. As a result, in the force component in the z-direction, the increase due to the increase of extension is promoted, while the increase due to the reduction of inclination relative to the z-direction is suppressed.

Summarizing the above, at the time when the degree of increase of the force component in the z-direction due to the increase of extension is relatively large and the degree of increase of the ratio of the force component in the z-direction due to the change of inclination is relatively large, the increase due to the increase of extension is suppressed while the increase due to the reduction of inclination relative to the z-direction is promoted. When the degree of increase due to the increase of extension is relatively small and the degree of increase of the ratio of the force component in the z-direction due to the change of inclination is relatively small, the increase due to the increase of extension is promoted while the increase due to the reduction of inclination relative to the z-direction is suppressed. Accordingly, for the force component in the z-direction, as a whole, the influence by the increase of extension is relatively small while the influence by the reduction of inclination relative to the z-direction is made relatively large. As a result, for example, the spring constant as the whole of the positive spring mechanism 17U can be made relatively large relative to the displacement of the spring shaft 27U.

(Preferred Example of Settings of Negative Spring Mechanism)

In the negative spring mechanism 17D, there are innumerable constants and initial states of the spring shaft 27D and interspring 29D for utilizing the unbalanced force as described above to realize a negative spring constant. In the following description, a preferred example of settings will be explained.

Figure 3A:
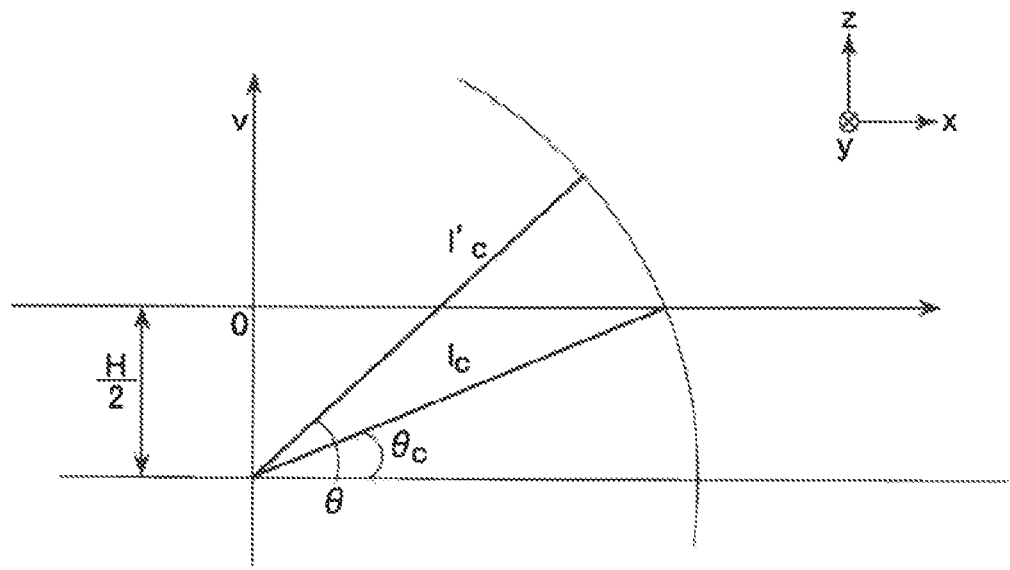
FIG. 3A and FIG. 3B are views showing definition of notations concerning the constant load spring mechanism in FIGS. 2A and 2B.

FIG. 3A is a schematic view showing definitions of notations relating to various parameters used in the following explanation.

The contents indicated by the notations etc. described in the drawings are as follows:

v: Coordinate axis which passes through the connection part of the spring shaft 27D and the column 23D and is parallel to the z-direction.

0: Origin on the v-axis. In the following description, the time when the connection part of the spring shaft 27D and the slider 25D is positioned at the height of the origin 0 is defined as the initial state.

H/2: Distance between the origin and the connection part of the spring shaft 27D and the column 23D.

$\theta_c$: Angle of the spring shaft 27D relative to the x-direction at the time of the initial state described above. Initial angle. The counterclockwise direction is defined as positive.

$l_c$: Length of spring shaft 27D at the time of initial angle $\theta_c$. Initial length.

$\Delta l_0$ (not shown): Deformation amount (contraction) in the axial direction of the spring shaft 27D at the time of initial length $l_c$. This will be sometimes referred to as the "initial deformation amount". Compression is defined as positive.

$\theta$: Angle of the spring shaft 27D relative to the x-direction. The counterclockwise direction is defined as positive.

$l_c'$: Length of the spring shaft 27D at the time of angle $\theta$.

First, the geometric relationships according to FIG. 3A can be summarized as follows:

$$H/2 = l_c \sin \theta \quad (1)$$

$$l_c' = l_c + \Delta l_c \quad (2)$$

where, $\Delta l_c$ is the amount of increase of displacement of the spring shaft 27D at the time when the angle $\theta_c$ changes to the angle $\theta$ (same definition as the amount of increase of displacement of the spring).

$$l_c' \sin \theta = H/2 + v \quad (3)$$

Next, the action of the force will be studied.

When defining the spring constant of the spring shaft 27D as "$k_S$", the force $f_c$ exerted by the spring shaft 27D (the outward orientation is positive) is represented by the following equation:

$$f_c(\theta) = k_s(\Delta l_0 - \Delta l_c) \quad (4)$$

Note that, by the extension of the spring shaft 27D, the amount of initial deformation (contraction) is reduced, therefore the notations as described above are obtained:

The spring constant of the interspring 29D is defined as "$K_1$", and the amount of deformation in the initial state explained above (initial deformation amount. Compression is defined as positive) is defined as "$\Delta l_I$". The equation of balance of forces in the x-direction at the angle $\theta$ becomes the following equation:

$$k_s(\Delta l_0 - \Delta l_c) \cos \theta - K_I(\Delta l_I + l_c' \cos \theta - l_c \cos \theta_c) = 0 \quad (5)$$

On the other hand, the initial deformation amount and the spring constant are adjusted so that the amount of increase of displacement of the spring shaft 27D becomes zero at the angle $\theta_c$, therefore the following equation of balance of forces in the horizontal direction stands:

$$k_s \Delta l_0 \cos \theta_c - K_I \Delta l_I = 0 \quad (6)$$

When erasing the initial deformation amount $\Delta l_I$ from Equation (5) by using Equation (6) described above and solving the spring constant $K_I$, the following equation is obtained:

$$K_I = k_s(\Delta l_0 \cos \theta - \Delta l_c \cos \theta - \Delta l_0 \cos \theta_c)/(l_c \cos \theta + \Delta l_c \cos \theta - \Delta l_c \cos \theta_c) \quad (7)$$

Here, the amount of increase of displacement $\Delta l_c$ of the spring shaft 27D is assumed to be as follows:

$$\Delta l_c = 0 \quad (8)$$

When entering the above Equation (8) into Equation (7) and the equation is cleaned up, the following equation is obtained:

$$K_I = k_s \times \Delta l_0 / l_c \quad (9)$$

That is, the spring constant $K_1$ of the interspring 29D is decided assuming that the spring shaft 27D does not expand and/or contract even if it rotates. When entering Equation (9) into Equation (7) and solving the amount of increase of displacement $\Delta l_c$ of the spring shaft 27D, Equation (8) can be derived as already separately confirmed. That is, when applying the spring constant found in Equation (9) to the interspring 29D, the horizontal forces can be balanced without expansion/contraction of the spring shaft 27D.

At this time, by entering Equation (9) into Equation (6), the initial deformation amount contributing to the interspring becomes as in the following equation:

$$\Delta l_I = l_c \cos \theta_c \quad (10)$$

Further, the unbalanced force in the vertical direction becomes as in the following equation:

$$F_v(\theta) = k_s(\Delta l_0 - \Delta l_c) \sin \theta \quad (11)$$

The above Equation (3) and Equation (8) are entered into Equation (11) to obtain the following equation:

$$F_v(v) = k_s \times \Delta l_0 / l_c \times (H/2 + v) \quad (12)$$

According to this Equation (12), a positive unbalanced force $F_v(v)$ proportional to the vertical coordinate v is generated in the vertical direction.

(Preferred Example of Settings of Positive Spring Mechanism)

In the positive spring mechanism 17U as well, in the same way as the negative spring mechanism, there are innumerable spring constants and initial states of the spring shaft 27U and interspring 29U. In the following description, a preferred example of the settings will be explained.

Figure 3B:
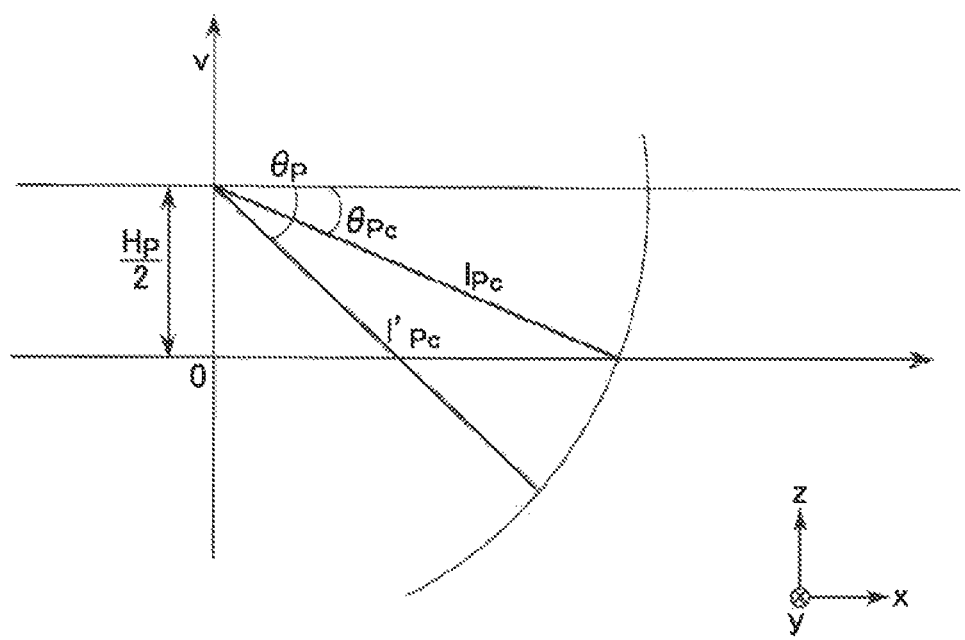

FIG. 3B is a schematic view showing definition of notations relating to various parameters used in the following explanation. As shown in this view, the origin 0 and the v-axis are plotted in the same way as FIG. 3A and the notation P is attached to notations used in the negative spring mechanism 17D.

That is, the contents indicated by the notations etc. described in the same view are as follows:

v: Coordinate axis which passes through the connection part of the spring shaft 27U and the column 23U and is parallel to the z-direction.

0: Origin on the v-axis. The time when the connection part of the spring shaft 27U and the slider 25U is positioned at the height of the origin 0 is defined as the initial state.

$H_P/2$: Distance between the origin and the connection part of the spring shaft 27U and the column 23U.

$\theta_{Pc}$ Angle of the spring shaft 27U relative to the x-direction at the time of the initial state described above. Initial angle. The clockwise direction is defined as positive.

$l_{Pc}$: Length of spring shaft 27U at the time of initial angle $\theta_{Pc}$. Initial length.

$\Delta l_{P0}$ (not shown): Deformation amount (elongation) in the axial direction of the spring shaft 27U at the time of initial length $l_{Pc}$. This will be sometimes referred to as the "initial deformation amount". The tension is defined as positive.

$\theta_P$: Angle of the spring shaft 27U relative to the x-direction. The clockwise direction is defined as positive.

$l_{Pc}'$: Length of the spring shaft 27D at the time of angle $\theta_P$.

Note that, the above are different from the definitions in the negative spring mechanism 17D in the point that $\theta_{Pc}$ and $\theta_P$ define the clockwise direction as positive and the point that $\Delta l_{P0}$ defines the tension as positive.

First, the geometric relationships according to FIG. 3B can be summarized as follows:

$$H_P/2 = l_{Pc} \sin \theta_P \qquad (13)$$

$$l_{Pc}' = l_{Pc} + \Delta l_{Pc} \qquad (14)$$

where, $\Delta l_{Pc}$ is the amount of increase of displacement of the spring shaft 27U at the time when the angle $\theta_{Pc}$ changes to the angle $\theta_P$ (same definition as the amount of increase of displacement of the spring).

$$l_{Pc}' \sin \theta_P = H_P/2 - v \qquad (15)$$

Next, the action of the force will be studied.

When defining the spring constant of the spring shaft 27U as "$k_{Ps}$", the force $f_{Pc}$ exerted by the spring shaft 27U (the outward orientation is positive) is represented by the following equation:

$$f_{Pc}(\theta_P) = -k_{Ps}(\Delta l_{P0} + \Delta l_{Pc}) \qquad (16)$$

Note that, by the extension of the spring shaft 27U, the amount of initial deformation (elongation) increases, therefore the notations as described above are obtained.

The spring constant of the interspring 29U is defined as "$K_{PI}$", and the amount of deformation in the initial state explained above (initial deformation amount. Compression is determined as positive) is defined as "$\Delta l_{PI}$". The equation of balance of forces in the x-direction at the angle $\theta_P$ becomes the following equation:

$$k_{Ps}(\Delta l_{P0} + \Delta l_{Pc})\cos\theta_P - K_{PI}(\Delta l_{PI} - l_{Pc}' \cos\theta_P + l_{Pc}\cos\theta_{Pc}) = 0 \qquad (17)$$

On the other hand, the initial deformation amount and the spring constant are adjusted so that the amount of increase of displacement of the spring shaft 27U becomes zero at the angle $\theta_{Pc}$, therefore the following equation of balance of forces in the horizontal direction stands:

$$k_{Ps}\Delta l_{P0} \cos\theta_{Pc} - K_{PI}\Delta l_{PI} = 0 \qquad (18)$$

When erasing the initial deformation amount $\Delta l_{PI}$ from Equation (17) by using Equation (18) described above and solving the spring constant $K_{PI}$, the following equation is obtained:

$$K_{PI} = -k_{Ps}(\Delta l_{P0}\cos\theta_P + \Delta l_{Pc}\cos\theta_P - \Delta l_{P0}\cos\theta_{Pc})/(l_{Pc}\cos\theta_P + \Delta l_{Pc}\cos\theta_P - l_{Pc}\cos\theta_{Pc}) \qquad (19)$$

Here, let us assume that the amount of increase of displacement $\Delta l_{Pc}$ of the spring shaft 27U is as follows:

$$\Delta l_{Pc} = 0 \qquad (20)$$

When the above Equation (20) is entered into Equation (19) and is cleaned up, the following equation is obtained:

$$K_{PI} = k_{Ps} \times \Delta l_{P0}/l_{Pc} \qquad (21)$$

In actuality, it is not easy to set a spring having a negative spring constant as shown in Equation (21). Therefore, it will be assumed that $\Delta l_{Pc}$ fluctuates in this study.

The equation of balance of horizontal forces where $\theta = \theta_c$ in the negative spring mechanism 17D (Equation (6)) is different in the orientation of forces from the equation of balance where $\theta_P = \theta_{Pc}$ in the positive spring mechanism 17U (Equation (18)), but shows the same balanced state. Therefore, assuming that the spring constant and initial deformation amount of the interspring 29U are $K_{PI} = K_I$ and $\Delta l_{PI} = \Delta l_I$ (however, the definition of positive/negative is different), the amount of fluctuation of $\Delta l_{Pc}$ and the characteristic of the unbalanced force in the vertical direction will be evaluated.

The amount of increase of displacement $\Delta l_{Pc}$ of the spring shaft 27U may be solved for $\Delta l_{Pc}$ by entering Equation (9) and Equation (10) into Equation (17). The derived solution is extremely troublesome, therefore this will be shown as follows:

$$\Delta l_{Pc} = \Delta l_{Pc}(l_{Pc}, H_P, v, k_{Ps}, \Delta l_{P0}) \qquad (22)$$

The unbalanced force in the vertical direction is represented by the following equation:

$$F_{Pv}(\theta_P) = k_{Ps}(\Delta l_{P0} + \Delta l_{Pc})\sin\theta_P \qquad (23)$$

When entering Equation (15) and cleaning it up, the following equation is obtained:

$$F_{Pv}(v) = k_{Ps} \times (\Delta l_{P0} + \Delta l_{Pc})/(l_{Pc} + \Delta l_{Pc}) \times (H_P/2 - v) \qquad (24)$$

The vertical coordinate v and the unbalanced force are in a nonlinear relationship due to the amount of extension $\Delta l_{Pc}$ of the spring shaft 27U. In a range where the amount of extension of the spring shaft 27U is sufficiently small, the following approximation stands:

$$F_{Pv}(V) = k_{Ps} \times \Delta l_{P0}/l_{Pc} \times (H_P/2 - v) \qquad (25)$$

At this time, the spring constant shows a constant value, and a negative unbalanced force proportional to the vertical coordinate v is generated.

Note that, in the above description, $K_{PI} = K_I$ and $\Delta l_{PI} = \Delta l_I$ were assumed. However, this assumption need not stand. As can be deduced from Equation (9) and Equation (10) for the negative spring mechanism 17D, if $K_{PI} = k_{Ps} \times \Delta l_{P0}/l_{Pc}$ and $\Delta l_{PI} = l_{Pc} \times \cos\theta_{Pc}$ stand, Equation (24) and Equation (25) are derived.

(Preferred Example of Setting of Constant Load Spring Mechanism)

In the same way as there being innumerable spring constants and initial states in the negative spring mechanism 17D and the positive spring mechanism 17U, there are innumerable spring constants and initial states even in the constant load spring mechanism 11 combining them. In the following description, a preferred example of the setting will be explained.

The preferred example of the setting of the spring mechanism 11 is for example a combination of the preferred example of the setting of the negative spring mechanism 17D and the preferred example of the setting of the positive spring mechanism 17U explained above. The spring characteristic at this time is as follows:

For the preferred example of the settings of the negative spring mechanism 17D and positive spring mechanism 17U explained above, when the unbalanced force is added, the following equation is obtained:

$$f_v(v) = F_v(V) + F_{Pv}(v) = k_s \times \Delta l_0/l_c \times (H/2 - v) + k_{Ps} \times \Delta l_{P0}/l_{Pc} \times (H_P/2 - V) \qquad (26)$$

Here, assuming that:

$$K_s = k_s \times \Delta l_0/l_c \text{ and}$$

$$K_{Ps} = k_{Ps} \times \Delta l_{P0}/l_{Pc}$$

$K_x$ and $K_{Ps}$ correspond to the spring constants of the elastic forces in the z-direction of the negative spring mechanism 17D and positive spring mechanism 17U.

When Equation (26) is cleaned up by using these spring constants $K_s$ and $K_{Ps}$, the following equation is obtained:

$$f_v(v) = (K_s H + K_{Ps} H_P)/2 + (K_s - K_{Ps})v \qquad (27)$$

Accordingly, so far as $K_s = K_{Ps}$, the constant load spring mechanism characteristic defining the first term on the right side in Equation (27) as the elastic force is realized.

There are innumerable combinations of $l_c$, $k_s$, $\Delta l_0$, $l_{Pc}$, $k_{Ps}$, and $\Delta l_{P0}$ satisfying $K_s = K_{Ps}$. For example, for convenience, they are $l_c = l_{Pc}$, $k_s = k_{Ps}$, and $\Delta l_0 = \Delta l_{P0}$. Further, H may be equal to $H_P$ as well. In this case, from Equation (27), the following equation is obtained:

$$f_v(v) = k_s \times \Delta l_0 / l_c \times H = \text{const.} \qquad (28)$$

(Example of Spring Characteristic)

Predicated on the preferred example of the setting (Equation (28)) explained above, the spring characteristic was found by computation. The computation conditions were as follows:

$l_c = 300$ mm $k_s = 0.102$ N/mm $\Delta l_0 = 117.7$ mm $H = 150$ mm

Note that, the target value of $f_v$ is 6.0N.

Figure 4:
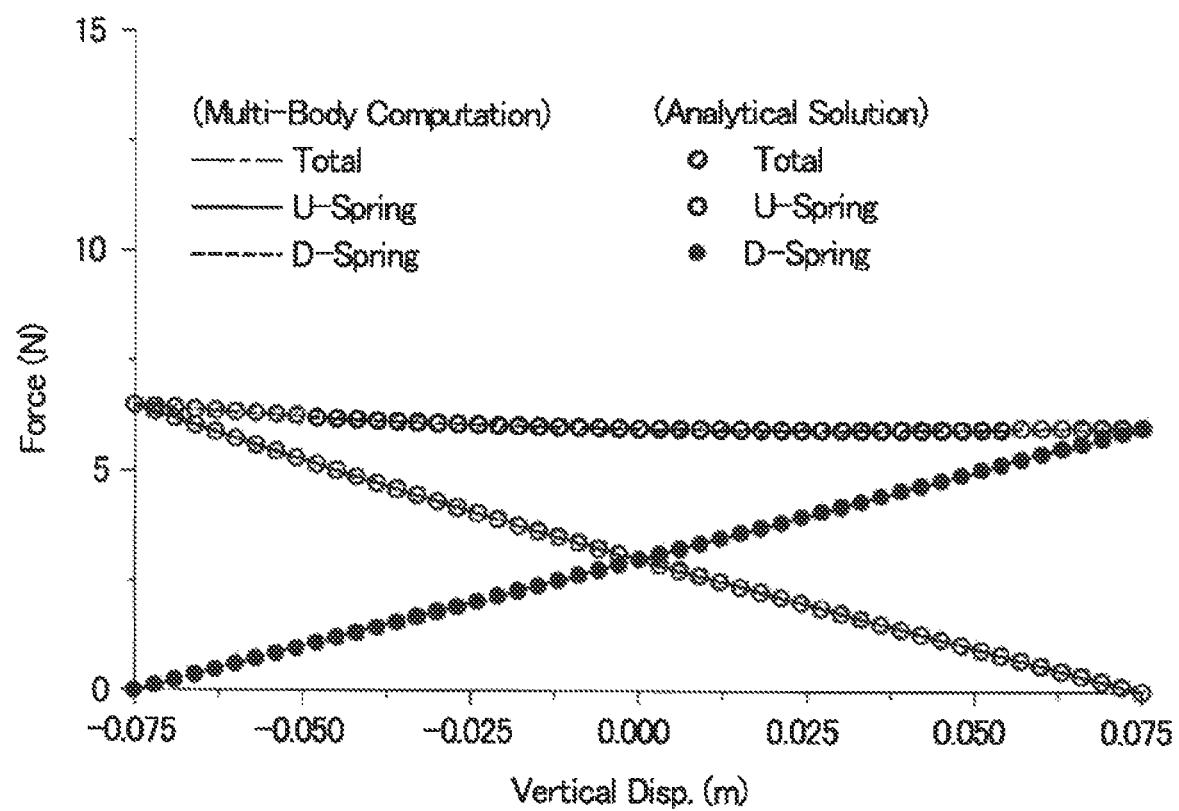
FIG. 4 A graph showing the characteristics of the constant load spring mechanism in FIGS. 2A and 2B.

FIG. 4 shows the computation results. An abscissa "Vertical Disp." indicates the coordinate v of the loading plate 15 (point P1 in FIG. 1). An ordinate "Force" indicates the force which is imparted to the positive side in the z-direction with respect to the loading plate 15 from various types of spring mechanisms.

"Analytical Solution" indicates the theoretical solution. "Multi-Body Computation" indicates the numerical analytic result according to a kinetic model. "Total" indicates the force according to the spring mechanism 11, "U-Spring" indicates the force according to the positive spring mechanism 17U, and "D-Spring" indicates the force according to the negative spring mechanism 17D.

The theoretical solution and the numerical analytic result according to the kinetic model coincide well. Further, the force in the entire spring mechanism 11 is constant and coincides with the target magnitude.

(Adjustment of Spring Characteristics)

It will be understood from the above Equation (27) that the constant load value $f_v$ can be changed if either of $l_c$, $k_s$, $\Delta l_0$, H, $l_{Pc}$, $k_{Ps}$, $\Delta l_{P0}$, and Hp is changed. More conveniently, in a setting where Equation (28) stands, any of $k_s$, $\Delta l_0$, $l_c$, and H may be changed.

However, for any parameter, the spring constant or initial deformation amount of the interspring 29 must be simultaneously changed. In order to easily change the constant load value $f_v$, practically the height H and/or $H_P$ of the spring shaft 27 (from another viewpoint, the distance in the z-direction between the connection position of the spring shaft 27D with respect to the column 23D and the connection position of the spring shaft 27U with respect to the column 23U) is changed. In this case, adjustment of the initial deformation amount $\Delta l_I$ of the interspring 29 becomes necessary along with the change of the height H and/or $H_P$. In general, the initial deformation amount of the interspring 29 is large, while the change of the initial deformation amount $\Delta l_I$ along with the change of the height H and/or $H_P$ is small enough to ignore. For this reason, in order to change the constant load value $f_v$, only the height H and/or $H_P$ need be changed in many cases. Further, in the case as shown in Equation (28), the constant load value $f_v$ is directly proportional to the height H, therefore also mechanical handling is easy.

Therefore, computation was carried out in the same way as the computation in FIG. 4 while changing the height H. Note that, the computation conditions are the same as those in FIG. 4 except the height H ($=H_P$).

Figure 5A:
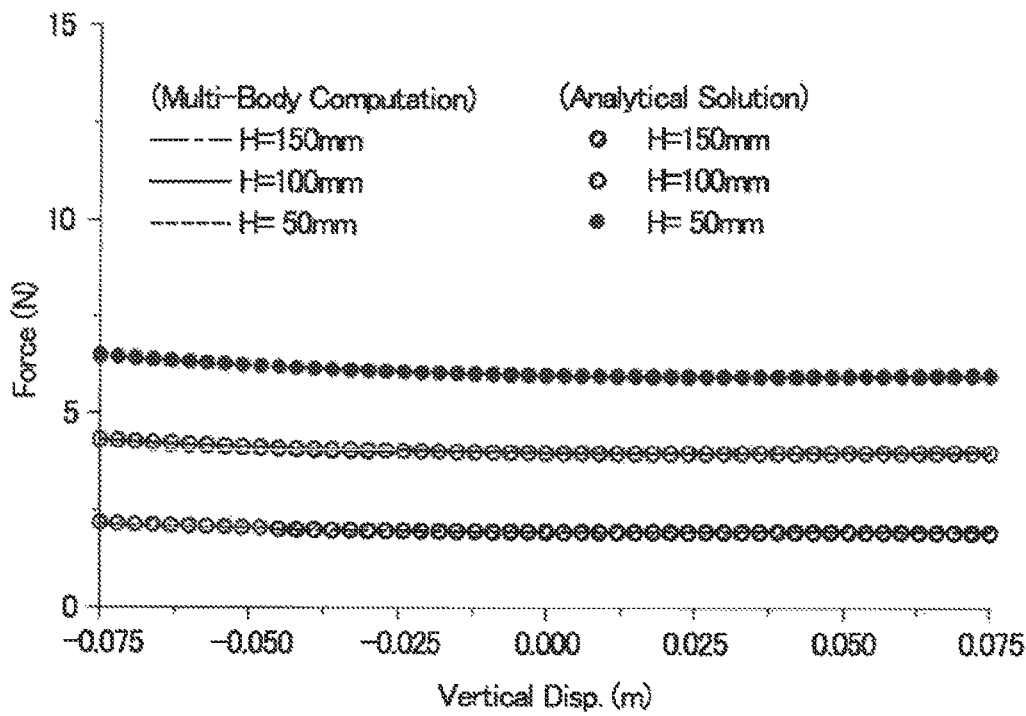
FIG. 5A and FIG. 5B are graphs showing variable characteristics of the constant load spring mechanism in FIGS. 2A and 2B.
Figure 5B:
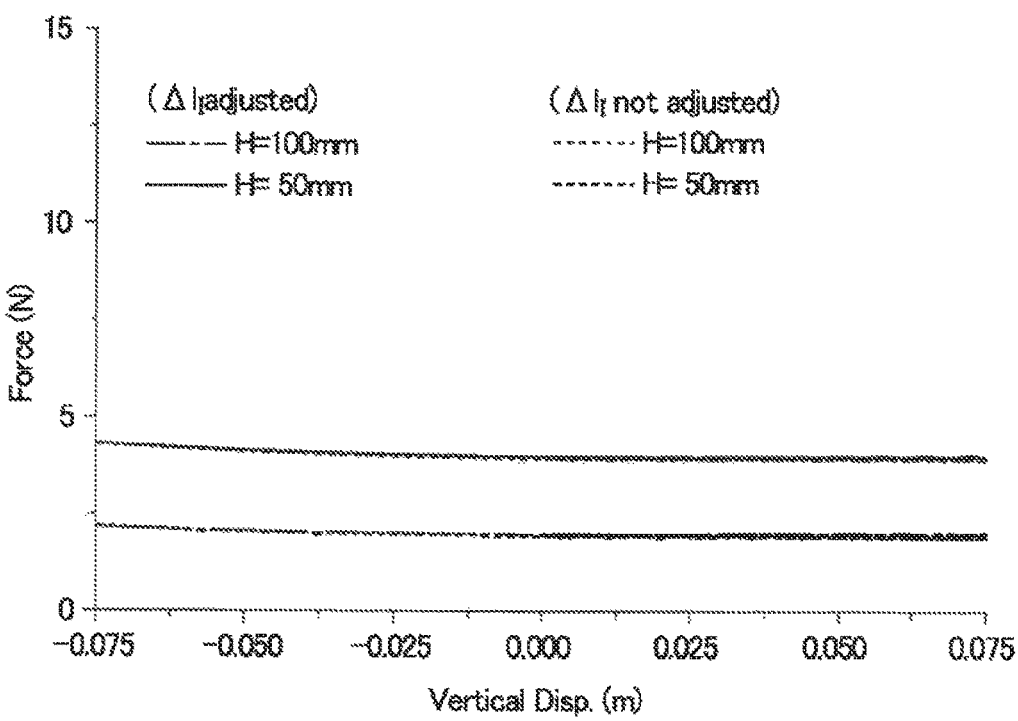

FIGS. 5A and 5B show the computation results of that. The meanings of the abscissa "Vertical Disp.", the ordinate "Force", "Analytical Solution", and "Multi-Body Computation" are the same as those in FIG. 4. Further, as shown in the same graph, computation was carried out for three cases of H=150 mm, H=100 mm, and H=50 mm. Note that, each computation result indicates the elastic force of the spring mechanism 11 as a whole.

As shown in this graph, the constant load value $f_v$ can be changed by changing the height H. Further, the theoretical solution and the numerical analytic result according to the kinetic model coincide.

Further, the numerical analysis according to the kinetic model was carried out for the case where the initial deformation amount $\Delta l_I$ was adjusted when the height H was changed and the case where it was not adjusted. Note that, the computation conditions are the same as those in FIG. 4 except for the height H ($=H_P$) and $\Delta l_I$.

The meanings of the abscissa "Vertical Disp." and the ordinates "Force" are the same as those in FIG. 4. "$\Delta l_I$ adjusted" is the computation result where the initial deformation amount $\Delta l_I$ is adjusted, while "$\Delta l_I$ not adjusted" is the computation result where the initial deformation amount $\Delta l_I$ is not adjusted. As shown in the graph, computation was carried out for the two cases of H=100 mm and H=50 mm.

As shown in this graph, at the time of change of the height H, there is almost no difference between the case where the initial deformation amount $\Delta l_I$ is adjusted and the case where it is not adjusted.

As described above, in the spring mechanism 11 according to the present embodiment, the negative spring mechanism 17D biasing the loading plate 15 to the positive side in the z-direction has the spring shaft 27D and interspring 29D. The spring shaft 27D is rotatably connected to the fixed part 13 and is connected (through the slider 25D) with respect to the loading plate 15 so that it can rotate and can move in the x-direction. The connection part with the loading plate 15 is positioned on the positive side in the z-direction and on the positive side in the x-direction relative to the connection part with the fixed part 13 (The spring shaft 27D is inclined). An elastic force countering the compression is generated by the spring shaft 27D. The interspring 29D is connected to the loading plate 15 and is connected (through the slider 25D) to the spring shaft 27D. It generates an elastic force countering the displacement to the positive side in the x-direction of the connection part of the spring shaft 27D with the loading plate 15.

Accordingly, for example, a negative spring constant can be suitably realized according to the principle of utilizing the unbalanced force. This negative spring mechanism 17D, for example, has a broader range of displacement where the negative spring constant can be realized compared with the related art of utilizing only the change of the orientation of the spring. Further, the negative spring mechanism 17D, for example, can be changed in the spring constant by changing the position in the z-direction of the connection part of the spring shaft 27D with the fixed part 13 or the position in the x-direction of the connection part of the interspring 29D with the loading plate 15. Such a mechanism having variability of the negative spring constant has not been proposed in the past.

Further, in the spring mechanism 11 according to the present embodiment, the positive spring mechanism 17U biasing the loading plate 15 to the positive side in the z-direction has the spring shaft 27U and interspring 29U. The spring shaft 27U is rotatably connected to the fixed part 13 and is connected (through the slider 25U) with respect to the loading plate 15 so that it can rotate and can move in the x-direction. The connection part with the loading plate 15 is positioned on the negative side in the z-direction and on the positive side in the x-direction relative to the connection part with the fixed part 13 (The spring shaft 27U is inclined). An elastic force countering the tension is generated by the spring shaft 27U. The interspring 29U is connected to the loading plate 15 and is connected (through the slider 25U) to the spring shaft 27U. It generates an elastic force countering the displacement to the negative side in the x-direction of the connection part of the spring shaft 27U with the loading plate 15.

Accordingly, for example, a positive spring constant can be suitably realized according to the principle of utilizing the unbalanced force. This positive spring mechanism 17U, for example, can be changed in the spring constant by changing the position in the z-direction of the connection part of the spring shaft 27U with the fixed part 13 or the position in the x-direction of the connection part of the interspring 29U with the loading plate 15.

Further, in the present embodiment, the constant load spring mechanism 11 is configured by combining the negative spring mechanism 17D and positive spring mechanism 17U as described above. Therefore, for example, a constant load can be realized for a relatively broad displacement. Further, for example, by changing the position in the z-direction of the connection part of the spring shaft 27D and/or 27U with the fixed part 13 or changing the position in the x-direction of the connection part of the interspring 29D and/or 29U with the loading plate 15, the magnitude of the constant load can be changed.

Second Embodiment (Outline)

A spring mechanism in a second embodiment is the same in structure as the spring mechanism 11 in the first embodiment. That is, the spring mechanism in the second embodiment has the structure shown in FIG. 2A and FIG. 2B. Accordingly, in the explanation for the second embodiment, use will be made of the notations in the first embodiment.

However, the spring mechanism 11 in the second embodiment is different in the settings of the spring constant etc. from the first embodiment and functions to impact a constant spring characteristic to the constant load spring mechanism. Specifically, this is as follows.

In Equation (27) explained above, when assuming $K_s \neq K_{Ps}$, a special spring mechanism 11 having a predetermined spring constant (second term on right side) and having a predetermined constant load term (first term on right side) is obtained. Such a spring mechanism 11 is the spring mechanism in the present embodiment.

(Setting of Spring Constant)

The spring constant of the spring mechanism 11 in the second embodiment is represented by the following equation as apparent from the second term on the right side in Equation (27):

$$k_m = K_s - K_{Ps} \quad (29)$$

That is, $l_c$, $k_s$, $\Delta l_0$, $l_{Pc}$, $k_{Ps}$, and $\Delta l_{P0}$ may be suitably set in accordance with the desired spring constant $k_m$.

(Setting of Constant Load Term)

It will be understood from the constant load term (first term on right side) in the above Equation (27) that, for example, the value of the constant load can be changed if the height H and/or $H_P$ is changed.

Note that, the relationship between the heights H and $H_P$ becomes as follows. From Equation (29), the following equation stands:

$$K_{Ps} = k_m - K_s \quad (30)$$

On the other hand, when the position of the origin is set to a neutral position of the spring characteristic described above, when the predetermined constant load value is $f_0$, the following equation stands:

$$f_0 = (K_s H + K_{Ps} H_P)/2 \quad (31)$$

When Equation (30) is entered into this Equation (31) to solve the hinge height $H_P$ of the spring shaft 27U, finally the next equation is obtained:

$$H_P = -(1-\alpha_f)/(1-\alpha_m) \times H \quad (32)$$

where, $$\alpha_f = 2f_0/(K_s H)$$

$$\alpha_m = k_m/K_s$$

Assume the spring constant is constant and consider the change of the magnitude of the constant load by a constant ratio $\alpha_c$. In this case, from Equation (27) or Equation (31), the following equation is obtained:

$$\alpha_c f_0 = (K_s \alpha_c H + K_{Ps} \alpha_c H_P)/2 \quad (33)$$

It will be understood from this equation that $\alpha_c H$ and $\alpha_c H_P$ may be made the new H and H.

(Example of Spring Characteristic)

The theoretical solution of the spring characteristic based on the above equation was computed. The computation conditions were as follows:

$l_c$ = 300 mm $k_s$ = 0.102 N/mm $\Delta l_0$ = 117.7 mm $H$ = 100 mm

Constant load $f_0$: 4.0N ($\alpha_f$=2)

Figure 6:
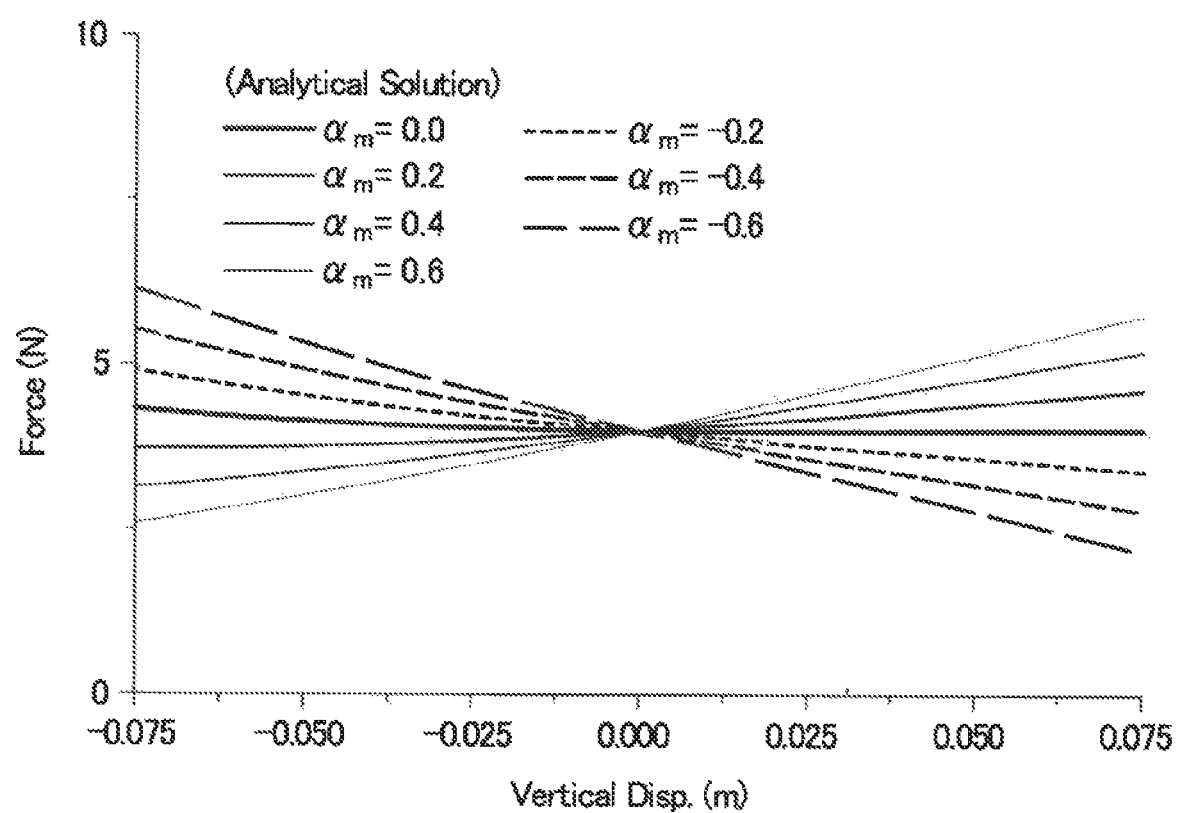
FIG. 6 A graph showing the characteristics of a spring mechanism according to a second embodiment.

FIG. 6 shows the computation results. The meanings of the abscissa "Vertical Disp.", the ordinate "Force", and "Analytical Solution" are the same as those in FIG. 4. Further, as shown in the same graph, $\alpha_m$ was changed from −0.6 to 0.6. Specifically, the spring constant $K_{Ps}$ was changed to change $k_m$ (see Equation (29)). Further, along with this, $H_P$ was changed based on Equation (32).

As shown in this graph, a constant spring characteristic is exhibited while keeping a constant load. Further, as this spring characteristic, it is possible to reproduce both of a positive spring characteristic and a negative spring characteristic according to the positive/negative sign of $\alpha_m$. Note that, $\alpha_m$=0 corresponds to the constant load spring mechanism 11 in the first embodiment.

As described above, in the present embodiment, by combining the negative spring mechanism 17D and positive spring mechanism 17U and making $K_s \neq K_{Ps}$ stand, a special spring mechanism where a constant spring characteristic is imparted to the constant load spring mechanism is realized. Such a spring mechanism is for example useful in a vertical base-isolation device etc. In addition, since this is based on the principle of utilizing an unbalanced force, in the same way as the first embodiment, the constant load can be changed. Further, the spring constant can be changed.

Third Embodiment (Outline)

Figure 7:
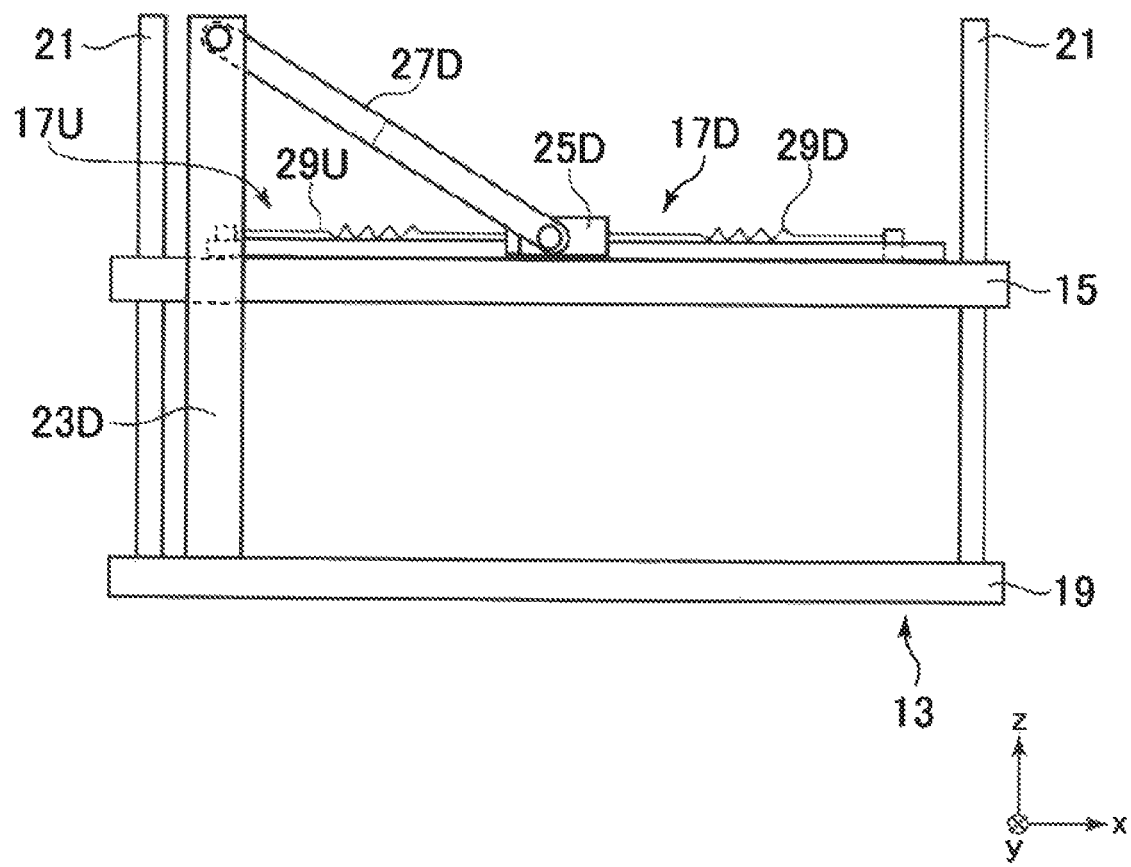
FIG. 7 A side view showing a spring mechanism according to a third embodiment.

FIG. 7 is a side view showing the configuration of a spring mechanism 311 in a third embodiment and corresponds to FIG. 2B for the first embodiment. Note that, the plan view of the spring mechanism 311 is the same as FIG. 2A. In FIG. 7, configurations the same as or similar to the first embodiment are assigned the same notations. Further, sometimes explanation of them will be omitted.

The spring mechanism 311, in the same way as the first embodiment, has a fixed part 13, loading plate 15, negative spring mechanism 17D, and positive spring mechanism 17U. Note, unlike the first embodiment, the negative spring mechanism 17D and the positive spring mechanism 17U are arranged on the same side in the z-direction.

Note that, in FIG. 7, the spring shaft 27U, slider 25U, and column 23U according to the positive spring mechanism 17U are hidden behind the spring shaft 27D, slider 25D, and column 23D according to the negative spring mechanism 17D and are not shown. In FIG. 7, the column 23D is provided relatively high. However, the fact like in the first embodiment, this may be provided higher in this way was already explained. Further, in FIG. 7, illustration of the holes 23h for adjusting the connection position of the spring shaft 27 with respect to the column 23 is omitted. However, in the same way as the first embodiment, adjustment of the connection position may be possible.

Such a spring mechanism 311 can be utilized for various applications. For example, like in the following description, it is possible to utilize the same mechanism as a spring mechanism capable of changing the spring constant in positive and negative wide ranges.

The negative spring mechanism 17D and the positive spring mechanism 17U are arranged on the same side, therefore the elastic force of the negative spring mechanism 17D and the elastic force of the positive spring mechanism 17U are cancelled out by each other. Further, if the loading plate 15 displaces in the z-direction, the elastic forces of the two are reduced, or the elastic forces of the two increase.

Accordingly, for example, in a case where the various types of parameters of the negative spring mechanism 17D and positive spring mechanism 17U are ones where Equation (28) explained in the first embodiment stands, that is, in a case where the settings of various parameters are equal between the negative spring mechanism 17 and the positive spring mechanism 17U, irrespective of the displacement of the loading plate 15, the spring mechanism 311 as a whole does not impart an elastic force to the loading plate 15.

On the other hand, for example, where various parameters are different between the negative spring mechanism 17D and the positive spring mechanism 17U and the elastic force of one is larger than the elastic force of the other, in the spring characteristic of the spring mechanism 311 as a whole, the characteristic of the spring mechanism 17 having a larger elastic force is apt to appear. According to such a principle, the spring constant can be changed over wide positive and negative ranges.

(Concrete Example of Method of Adjustment of Spring Constant)

Various techniques can be considered as the technique for making the magnitudes of elastic forces of the negative spring mechanism 17D and the positive spring mechanism 17U different. For example, the initial deformation amount of one spring shaft 27 may be compulsorily increased as well. Specifically, this is as follows. Note that, in the following description, the explanation will be given by taking as an example a case where the initial deformation amount is compulsorily changed in the positive spring mechanism 17U between the negative spring mechanism 17D and the positive spring mechanism 17U.

Here, based on Equation (12) and Equation (24), the spring constants $K_s$ and $K_{Ps}$ of the negative spring mechanism 17D and the positive spring mechanism 17U will be considered in the following way:

$$K_s = -k_3 \times \Delta l_0 / l_c \tag{34}$$

$$K_{Ps} = k_{Ps} \times (\Delta l_{P0} - \Delta l_{Pc}) / (l_{Pc} + \Delta l_{Pc}) \tag{35}$$

Now, assume that $l_c = l_{Pc}$, $k_s = k_{Ps}$, $\Delta l_0 = \Delta l_{P0}$, and $H = H_P$. Using these as the initial conditions, the following adjustment is carried out:

The initial deformation amount $\Delta l_P$ of the spring shaft 27U is increased and the deformation amount $\Delta l_0^*$ is compulsorily added. As a concrete mechanism, for example, stoppers provided on the two shaft-shaped members and holding the two ends of the tension spring are changed in positions relative to the shaft-shaped members. The positions of the stoppers are for example changed by combinations of slide guides and ball screws. The ball screws are for example driven manually (by manpower) or by electric motors.

If the deformation amount $\Delta l_0^*$ is compulsorily added, an amount of change of $\Delta dl_0$ occurs in the deformation amount resulting in the initial deformation amount $l_0$ changing to $l_{F0}$ and the length $l_c$ changing to $l_{Fc}$. Further, due to the interspring 29D, a change of $\Delta dl_I$ occurs, the initial deformation amount $l_I$ changes to $l_{FI}$, and the following balanced state relating to the horizontal direction is exhibited again.

$$k_s \Delta l_{F0} \cos \theta_{Fc} - K_I l_{FI} = 0 \tag{36}$$

where $$\Delta l_{F0} = \Delta l_0 - \Delta dl_0 \tag{37}$$

$$\Delta l_{FI} = \Delta l_I - \Delta dl_I \tag{38}$$

$$\Delta dl_I = l_c \cos \theta_c - l_{Fc} \cos \theta_{Fc} \tag{39}$$

where $$\sin \theta_{Fc} = H/(2 l_{Fc}) \tag{40}$$

When entering Equation (37) to Equation (40) into the above Equation (36), a formula relating to $\Delta dl_0$ is obtained. This can be solved. At this time, the value of the positive spring in Equation (34) has nonlinearity about $\Delta l_{Pc}$, and the spring constant changes in a range from the vertical coordinate origin (v=0) to the height H/2.

Based on the above equations, computations of the numerical analysis based on the theoretical solution and kinetic model were carried out using, as the parameters the ratio of the amount of increase $\Delta l_0^*$ (not a converged amount of increase at the time of re-balancing) of the forcible deformation amount relative to the initial deformation amount $\Delta l_0$.

Figure 8:
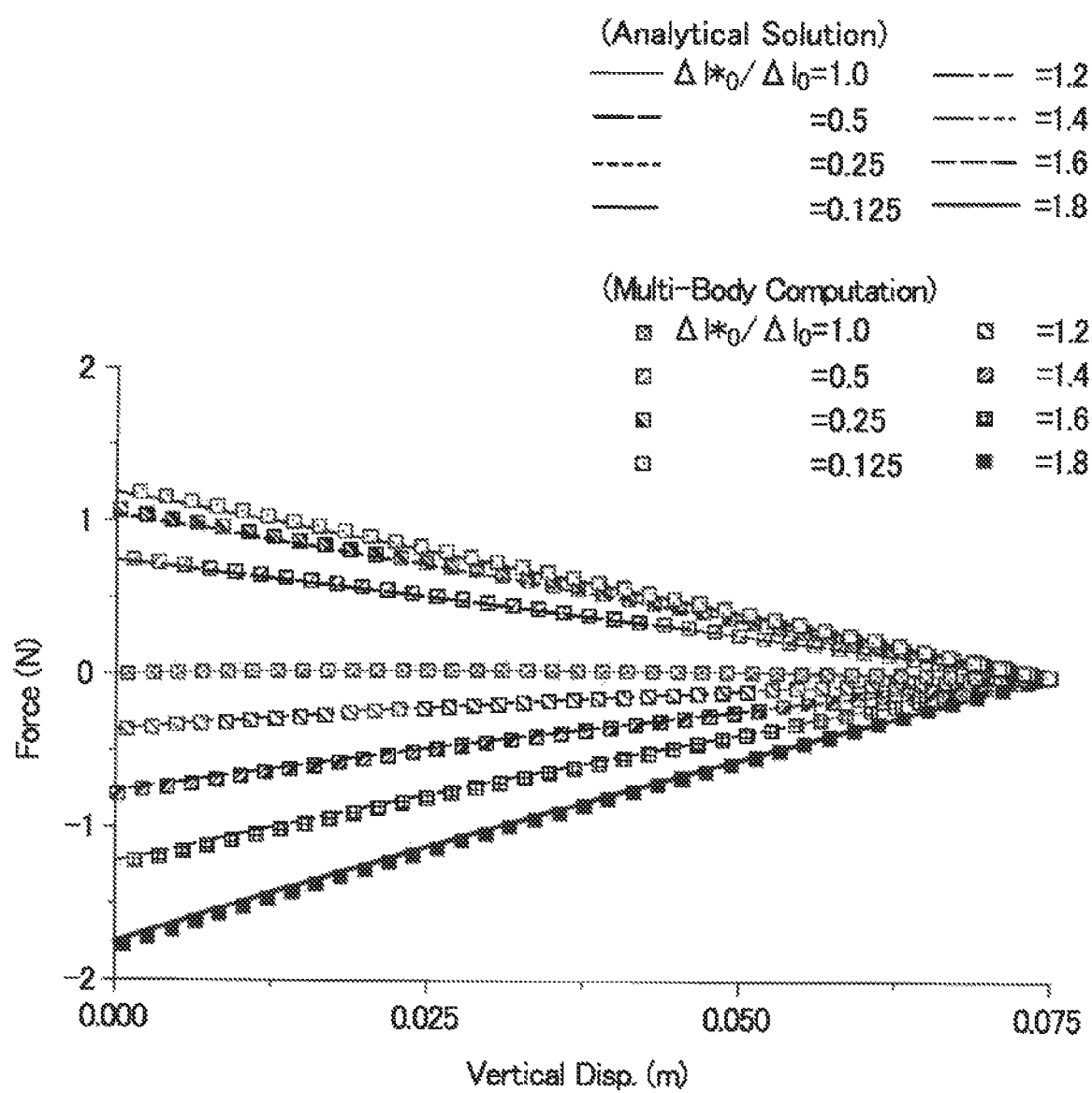
FIG. 8 A graph showing the characteristics of the spring mechanism in FIG. 7.

FIG. 8 shows the results of that computation. The meanings of the abscissa "Vertical Disp." and the ordinate "Force", "Analytical Solution", and "Multi-Body Computation" are the same as those in FIG. 4. Further, as shown in the same graph, $\Delta l_0*/\Delta l_0$ was changed from 0.125 up to 1.8.

As shown in the same graph, the spring constant can be changed from a positive spring constant to a negative spring constant. Further, the theoretical solution and the analysis result based on the kinetic model coincide.

As described above, in the present embodiment, by combining the negative spring mechanism 17D and the positive spring mechanism 17U utilizing the unbalanced force and making the biasing directions of the two inverse to each other, a special spring mechanism capable of changing the spring constant from positive to negative is realized.

Note that, although particularly not shown, if the loading plate 15 is moved higher than the height H/2, conversely to FIG. 7, the two of the positive spring mechanism 17U and the negative spring mechanism 17D are positioned on the negative side in the z-direction, therefore the characteristic of the spring mechanism 311 becomes a characteristic of the same magnitude of the force as that of the characteristic described above, but the opposite orientation. Accordingly, if the spring mechanism 311 is configured so that the loading plate 15 can move upward more than the height H/2 by configuring the vertical guide 21 high and so on, the positive/negative amount of movement and force can be obtained using the position at the height H/2 as the standard. That is, the same characteristic as that of the usual spring is obtained.

Fourth Embodiment

Figure 9:
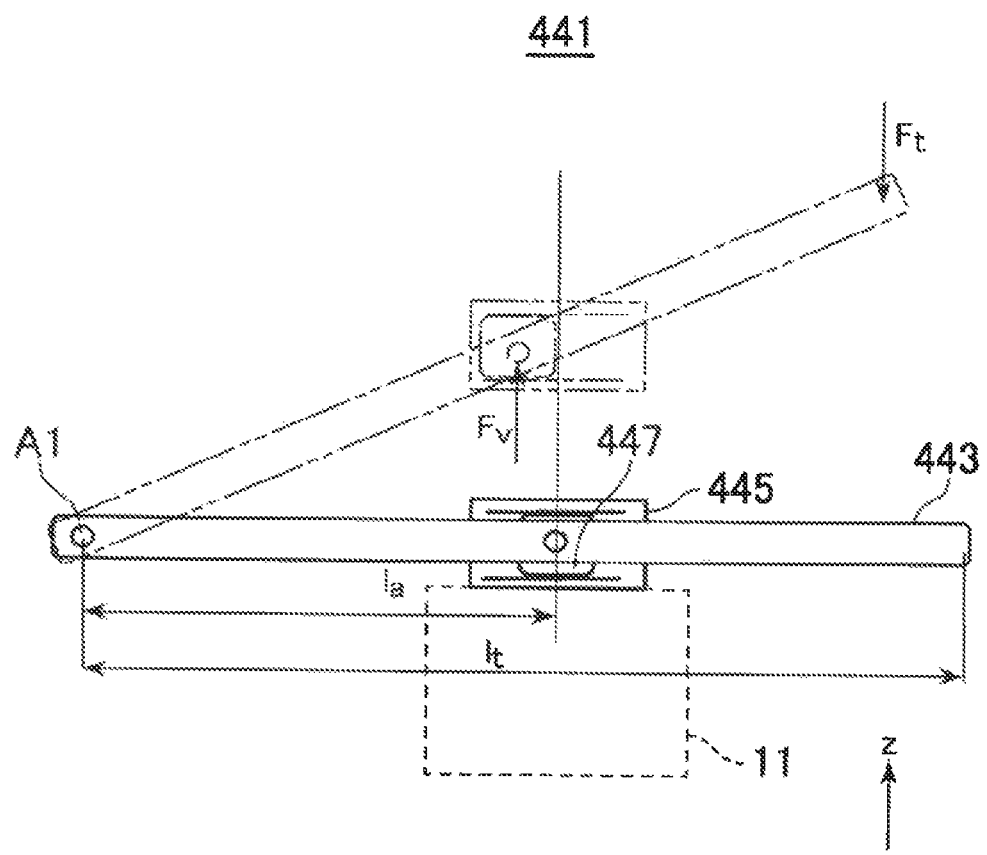
FIG. 9 A plan view showing principal parts in a spring mechanism according to a fourth embodiment.

FIG. 9 is a diagram showing principal parts of a spring mechanism 441 according to a fourth embodiment.

The spring mechanism 441 applies the spring mechanisms generating elastic forces in the first to third embodiments. Note that, in FIG. 9, notations in the spring mechanism 11 in the first embodiment are attached. However, the spring mechanisms in the other embodiments may be combined as well. The spring mechanism 441 is obtained by adding to the spring mechanism 11 a mechanism converting the elastic force of the spring mechanism 11 to a moment.

Specifically, for example, the spring mechanism 441 has an additional shaft 443 capable of rotating around a rotational axis A1 perpendicular to the z-direction, and the spring mechanism 441 imparts an elastic force to the direction crossing that additional shaft 443. Note that, the direction of extension of the rotational axis A1 only has to be perpendicular to the z-direction, and the orientation relative to the x-direction and y-direction does not matter.

More specifically, for example, the spring mechanism 441 has a slide guide 445 which is fixed to the loading plate 15 in the spring mechanism 11 or corresponds to the loading plate 15 and has a slider 447 which is held by the slide guide 445 so that it can move in the direction perpendicular to the rotational axis A1 and to the z-direction (the right and left direction on the drawing sheet). Further, the slider 447 is connected with respect to the additional shaft 443 so that it cannot move in the axial direction of the additional shaft 443 and can rotate around the rotational axis parallel to the rotational axis A1.

In such a configuration, assume that the elastic force $F_v$ of the spring mechanism 11 is applied to the additional shaft 443 at a position having a distance $l_a$ from the rotational axis A1. In this case, the spring mechanism 441 generates a moment of substantially $F_v \times l_a$. This moment is for example balanced with the moment $F_t \times l_t$ at the time when the force $F_t$ is applied to the additional shaft 443 at a position distant by $l_t$ from the rotational axis A1.

Note that, in the above embodiments, the first embodiment is one example of the invention according to claims 1 to 6 and 9 to 11 of the originally filed application. The second embodiment is one example of the invention according to claims 1 to 5, 7 and 9 to 11 of the originally filed application. The third embodiment is one example of the invention according to claims 1 and 8 and 9 to 11 (and claims 3 to 5 without citing claim 2) of the originally filed application. The fourth embodiment is one example of the invention according to claim 12 of the originally filed application.

The z-direction is one example of the main direction. In the first and second embodiments, the positive side in the z-direction is one example of the first side in the main direction, while the negative side in the z-direction is one example of the first side in the main direction in the third embodiment. The x-direction is one example of the first sub-direction and the second sub-direction. The positive side in the x-direction is one example of the second side in the first sub-direction and the third side in the second sub-direction. The y-direction is one example of the first rotational axis direction and second rotational axis direction. The rotational axis A1 is one example of the third rotational axis.

The spring mechanisms 1, 11, 311, and 411 are examples of the elastic mechanism. The loading plate 15 is one example of the movable part. The negative spring mechanism 17D is one example of the negative elastic mechanism. The positive spring mechanism 17U is one example of the positive elastic mechanism. The spring shaft 27D is one example of the negative side main elastic part. The spring shaft 27U is one example of the positive side main elastic part. The interspring 29D is one example of the negative side sub elastic part. The interspring 29U is one example of the positive side sub elastic part. The position adjustment mechanism 33D is one example of the negative side main elastic part position adjustment mechanism. The position adjustment mechanism 33U is one example of the positive side main elastic part position adjustment mechanism. The position adjustment mechanism 35D is one example of the negative side sub elastic part position adjustment mechanism. The position adjustment mechanism 35U is one example of the positive side sub elastic part position adjustment mechanism. The additional shaft 443 is one example of the rotary member.

The connection position of the spring shaft 27U with respect to the fixed part 13 is one example of the predetermined position of the fixed part. The entire spring shaft 27U is one example of the portion from the predetermined position of the fixed part up to the movable part in the positive side main elastic part.

The present invention is not limited to the above embodiments and may be executed in various aspects.

In the embodiments, an elastic mechanism having both of the negative elastic mechanism (negative spring mechanism 17D) and positive elastic mechanism (positive spring mechanism 17U) was shown. Note, the elastic mechanism may have only negative elastic mechanisms or only positive elastic mechanisms as well. Further, in a case where the negative elastic mechanism and the positive elastic mechanism are combined, only one need have the characteristic features of the present invention. The other may be a usual elastic mechanism. For example, the positive elastic mechanism may be a usual mechanical spring as well so far as variability of spring constant is unnecessary.

In the embodiments, as the sub elastic parts (intersprings 29), ones generating elastic forces countering compression were shown. Note, one or both of these sub elastic parts may generate elastic forces countering tension as well. However, in this case, in the sub elastic parts, the positions in the sub-direction (x-direction) relative to the main elastic parts (spring shafts 27) become inverse to that in the embodiments.

The main elastic parts (spring shafts 27) and the sub elastic parts (intersprings 29) are not limited to ones configured including helical springs. For example, in place of the helical springs, they may be configured including plate springs, air springs, or rubber.

Further, the elastic parts may manifest elastic forces countering tension by compression of elastic bodies inside as well. Conversely, they may manifest elastic forces countering compression by tension of elastic bodies inside as well. For example, this is as follows.

Figure 10A:
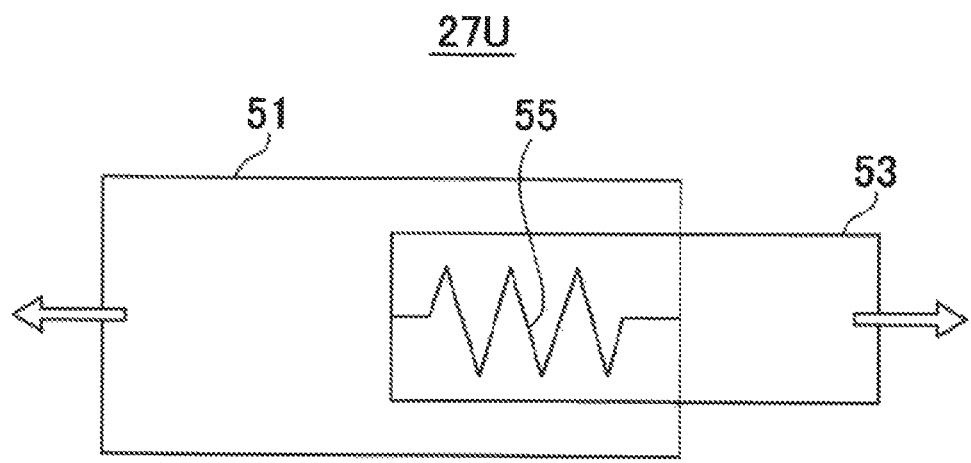
FIG. 10A and FIG. 10B are schematic views showing a modification of a spring shaft in a positive spring mechanism.
Figure 10B:
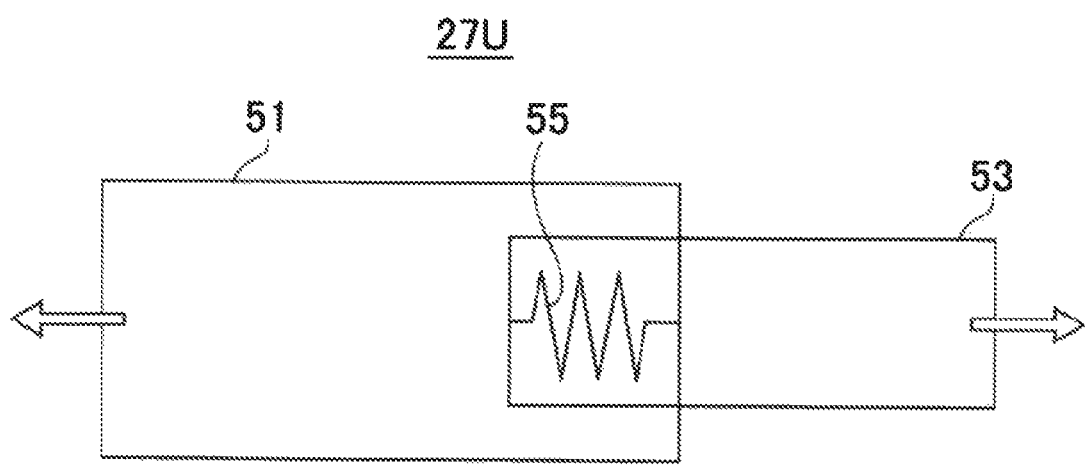

FIG. 10A and FIG. 10B are schematic views showing a modification of the spring shaft 27U. The spring shaft 27U has shaft-shaped members 51 and 53 which can move in the axial direction relative to each other and a compression spring 55 fixed to them. When the two shaft-shaped members 51 and 51 extend, the compression spring 55 is compressed and generates an elastic force countering compression. On the other hand, when viewing the entire spring shaft 27U, an elastic force countering tension ends up being generated.

In this way, between the elastic part (spring shaft 27U) and the elastic body inside (compression spring 55), compression and tension may be reversed. Generally, the allowable load and spring constant ranges of the tension spring tend to be narrower than these of the compression spring. Accordingly, as in this modification, if tension spring characteristics are realized by using a compression spring, the allowable load and spring constant ranges can be broadened, so this is preferred.

The shape of the main elastic parts and sub elastic parts as a whole need not be long length shapes. For example, when referring to the negative side main elastic part (spring shaft 27D), in accordance with approach or separation between the connection part with the fixed part and the connection part with the movable part (loading plate 15), an elastic force countering approach or separation only has to be generated in the direction connecting these connection parts. Therefore, the shape does not have to be a shaft connecting these connection parts to each other. The same is true also for the other elastic part.

Further, for example, the positive side main elastic part (spring shaft 27U) may be configured by including a wire connected to the slider 25U and including a helical spring which is connected to the wire and is connected to the fixed part 13. In this case, if extending the wire up to the column 23U, then changing the direction of the wire by a pin or roller, the helical spring itself can be oriented in any direction. That is, the connection position of the positive side main elastic part with respect to the fixed part and the predetermined position of the fixed part (claim 2 etc.) need not be the same either. Note that, in this case, it is possible to separately set the initial deformation amount ($\Delta l_{P0}$) and the height ($H_P$).

For a sub elastic part (interspring 29) as well, so far as utilizing an elastic force countering tension, the spring itself can be arranged in any direction by a configuration including a wire etc. Note that, in this case, the direction of elastic force in which the position is adjusted by the sub elastic part position adjustment mechanism (claim 4 etc.) is not limited to the sub-direction (x-direction). Further, it is the direction of the elastic force on the periphery of the connection position with respect to the movable part.

Note that, as understood also from the above explanation, in the case where the positive side main elastic part is connected to the movable part so that it can rotate around the axis parallel to the second rotational axis direction, a mechanism wherein a flexible member (wire) which is included in the positive side main elastic part and is fixed to the movable part is bent to thereby allow rotation (increase/decrease of inclination of a wire) is also included.

The sliders 25 (sub movable parts) which can move in the sub-direction (x-direction) relative to the movable part (loading plate 15) and are interposed between the main elastic parts (spring shaft 27) and the sub elastic parts (intersprings 29) are not essential requirements. For example, in the embodiments, the end parts of the spring shafts 27 may be directly connected to the loading plate 15 so that they can rotate around the y-axis and can move in the x-direction, while the intersprings 29 may be directly connected to the end parts of the spring shafts 27 so that they can rotate around the y-axis.

Note that, in the case described above, it is also possible to consider the end parts of the spring shafts 27 as the sliders (sub movable parts). Further, the present application describes that the main elastic parts (spring shafts 27) are connected to the movable part (loading plate 15) and that the sub elastic parts (intersprings 29) are connected to the connection parts of the main elastic parts with the movable part. Conversely, however, it is also possible to substantially say that the connection parts of the sub elastic parts on the main elastic part side are connected to the movable part so that they can move in the sub-direction (x-direction), and the main elastic parts are connected to the movable connection parts in the sub elastic parts so that they can rotate around an axis parallel to the rotational axis direction (y-direction).

In the embodiments, the spring shafts 27U and 27D were arranged on the same side in the x-direction relative to the loading plate 15 and were inclined to the same side in the x-direction relative to the z-direction. However, they may be arranged on inverse sides to each other relative to the loading plate 15 in the x-direction or may be inclined to inverse sides to each other of the x-direction relative to the z-direction. In other words, the second side in the sub-direction (positive side in the x-direction in the embodiments) in which the connection part of the negative side main elastic part (spring shaft 27D) with the movable part (loading plate 15) is positioned with respect to the connection part with the fixed part and the third side in the sub-direction (positive side in the x-direction in the embodiments) in which the connection part of the positive side main elastic part (spring shaft 27U) with the movable part is positioned with respect to the connection part with the fixed part (predetermined position of the fixed part) do not have to be the same as each other.

In the embodiments, the spring shaft 27U was positioned on the positive side in the z-direction relative to the spring shaft 27D. However, for example, it is also possible to provide a member which is relatively long in the z-direction in place of the loading plate 15 and position the spring shaft 27U on the negative side in the z-direction relative to the spring shaft 27D. However, the vertical relationships like in the embodiments are more advantageous for reduction of size.

The movement direction (x-direction) of the connection part of the main elastic part (spring shaft 27) with the movable part (loading plate 15) need not be perpendicular to the movement direction (z-direction) of the movable part. That is, the first and second sub-directions (x-direction) need not be perpendicular to the main direction (z-direction) either. However, various computations are easier in the case where the sub-directions are perpendicular to the main direction.

The movement direction (x-direction) of the connection part of the negative side main elastic part (spring shaft 27D) with the movable part (loading plate 15) and the movement direction (x-direction) of the connection part of the positive side main elastic part (spring shaft 27U) with the movable part need not be the same either. That is, the first sub-direction and the second sub-direction may be different from each other.

For example, in the embodiments, the connection part of the spring shaft 27D with the loading plate 15 may be movable in the x-direction, while the connection part of the spring shaft 27U with the loading plate 15 may be movable in the y-direction. That is, both of the first sub-direction and second sub-direction may be parallel in a plane perpendicular to the main direction and may be directions which are different from each other.

However, if the first sub-direction and the second sub-direction are the same directions as each other, as a whole, the spring mechanism is easily reduced in size. Further, between the negative side main elastic part and the positive side main elastic part, inclinations of the sub-directions relative to the main direction may be different from each other.

As understood also from the explanation of the first sub-direction and second sub-direction described above, the first rotational axis direction and the second rotational axis direction may also be directions different from each other.

The embodiments illustrated, as position adjustment mechanisms for adjusting the positions in the main direction of the main elastic parts (spring shafts 27) relative to fixed parts, combinations of pluralities of holes (23h) provided in the fixed parts and shaft members selectively inserted into any of these plurality of holes and supporting the main elastic parts. However, the position adjustment mechanisms not limited to such manual and discontinuous mechanisms. For example, the position adjustment mechanisms may have slide guides which guide the connection parts of the main elastic parts with the fixed parts in the main direction (z-direction) and ball screws moving the connection parts in the main direction and may manually (by manpower) or automatically (for example by electric motors) and continuously adjust the positions of the connection parts of the main elastic parts with the fixed parts. The position adjustment mechanisms for adjusting the positions of the sub elastic parts (intersprings 29) in the sub-direction relative to the movable part (loading plate 15), in the same way, may include slide guides and ball screws and may be able to adjust the positions manually or automatically and continuously.

REFERENCE SIGNS LIST

11 . . . spring mechanism (elastic mechanism), 13 . . . fixed part, 15 . . . loading plate (movable part), 17U . . . negative spring mechanism (negative elastic mechanism), 27D . . . spring shaft (negative side main elastic part), and 29D . . . interspring (negative side sub-elastic part).

The invention claimed is:

1. An elastic mechanism, comprising:
a fixed part,
a movable part movable in a predetermined main direction relative to the fixed part, and
a negative elastic mechanism which generates an elastic force biasing the movable part to a first side in the main direction relative to the fixed part and increasing the elastic force along with displacement of the movable part to the first side in the main direction, wherein
the negative elastic mechanism includes
 a negative side main elastic part which generates an elastic force biasing the movable part relative to the fixed part and
 a negative side sub elastic part which generates an elastic force biasing the negative side main elastic part relative to the movable part in a first sub-direction crossing the main direction, wherein
the negative side main elastic part
 is connected with respect to the fixed part by a first connection part, such that, at the first connection part, the first connection part rotates around a first axis parallel to a first rotational axis direction perpendicular to the main direction and to the first sub-direction,
 is connected with respect to the movable part by a second connection part, such that, at the second connection part, the negative side main elastic part moves in the first sub-direction and rotates around a second axis parallel to the first rotational axis direction,
 the second connection part being located on the first side in the main direction and on a second side in the first sub-direction relative to the first connection part, and
 has a positive spring characteristic generating an elastic force countering-approach of the second connection part and the first connection part; and
the negative side sub elastic part
 is connected to the movable part by a third connection part,
 is connected to the second connection part of the negative side main elastic part, and
 has a positive spring characteristic generating an elastic force countering displacement of the second connection part of the negative side main elastic part to the second side in the first sub-direction, and
further comprising a positive elastic mechanism which biases the movable part to the first side in the main direction relative to the fixed part and decreases the elastic force along with the displacement of the movable part to the first side in the main direction, wherein
the positive elastic mechanism includes
 a positive side main elastic part which generates an elastic force biasing the movable part relative to the fixed part and
 a positive side sub elastic part which generates an elastic force biasing the positive side main elastic part relative to the movable part in a second sub-direction crossing the main direction;
the positive side main elastic part
 includes a fourth connection part connected with respect to the fixed part and includes a portion reaching the movable part from a predetermined portion of the fixed part, is connected with respect to the movable part by a fifth connection part, such that, at the fifth connection part, the positive side main elastic part moves in the second sub-direction and rotates around a third axis parallel to a second rotational axis direction perpendicular to the main direction and to the second sub-direction, the fifth connection part being located on the opposite side to the first side in the main direction and on a third side in the second sub-direction relative to the predetermined portion of the fixed part, and has a positive spring characteristic generating an elastic force countering separation of the predetermined portion of the fixed part and the fifth connection part; and the positive side sub elastic part is connected to the movable part by a sixth connection part, is connected to the fifth connection part of the positive side main elastic part and has a positive spring characteristic generating an elastic force countering displacement of the fifth connection part of the positive side main elastic part to the opposite side to the third side in the second sub-direction.

2. The elastic mechanism according to claim 1, further comprising a negative side main elastic part position adjustment mechanism capable of adjusting the position of the first connection part of the negative side main elastic part with the fixed part at the fixed part in the main direction.

3. The elastic mechanism according to claim 1, further comprising a negative side sub elastic part position adjustment mechanism capable of adjusting the position of the third connection part of the negative side sub elastic part with the movable part at the movable part in the first sub-direction.

4. The elastic mechanism according to claim 1, wherein the first sub-direction is perpendicular to the main direction, and the elastic mechanism is configured such that the following equations $K_f = k_S \times \Delta l_0 / l_c$ and $\Delta l_f = l_c \times \cos \theta_c$ stand under the following definitions:

$k_S$ is a spring constant of the negative side main elastic part, $K_f$ is a spring constant of the negative side sub elastic part, in a state where the elastic force in the first sub-direction of the negative side main elastic part and the elastic force in the first sub-direction of the negative side sub elastic part are balanced, in the negative side main elastic part, $l_c$ is a length from the first connection part to the second connection part, $\Delta l_0$ is a contraction from a state not generating an elastic force, and $\theta_c$ is an inclination angle relative to the first sub-direction, of a direction from the first connection part to the second connection part, and $\Delta l_f$ is an amount of deformation of the negative side sub elastic part from the state not generating an elastic force.

5. An elastic mechanism, comprising:

a fixed part, a movable part movable in a predetermined main direction relative to the fixed part, and a negative elastic mechanism which generates an elastic force biasing the movable part to a first side in the main direction relative to the fixed part and increasing the elastic force along with displacement of the movable part to the first side in the main direction, wherein the negative elastic mechanism includes a negative side main elastic part which generates an elastic force biasing the movable part relative to the fixed part and a negative side sub elastic part which generates an elastic force biasing the negative side main elastic part relative to the movable part in a first sub-direction crossing the main direction, wherein the negative side main elastic part is connected with respect to the fixed part by a first connection part, such that, at the first connection part, the first connection part rotates around a first axis parallel to a first rotational axis direction perpendicular to the main direction and to the first sub-direction, is connected with respect to the movable part by a second connection part, such that, at the second connection part, the negative side main elastic part moves in the first sub-direction and rotates around a second axis parallel to the first rotational axis direction, the second connection part being located on the first side in the main direction and on a second side in the first sub-direction relative to the first connection part, and has a positive spring characteristic generating an elastic force countering-approach of the second connection part and the first connection part; and the negative side sub elastic part is connected to the movable part by a third connection part, is connected to the second connection part of the negative side main elastic part, and has a positive spring characteristic generating an elastic force countering displacement of the second connection part of the negative side main elastic part to the second side in the first sub-direction, wherein the first sub-direction is perpendicular to the main direction, and the elastic mechanism is configured such that the following equations $K_f = k_S \times \Delta l_0 / l_c$ and $\Delta l_f = l_c \times \cos \theta_c$ stand under the following definitions:

$k_S$ is a spring constant of the negative side main elastic part, $K_f$ is a spring constant of the negative side sub elastic part, in a state where the elastic force in the first sub-direction of the negative side main elastic part and the elastic force in the first sub-direction of the negative side sub elastic part are balanced, in the negative side main elastic part, $l_c$ is a length from the first connection part to the second connection part, $\Delta l_0$ is a contraction from a state not generating an elastic force, and $\theta_c$ is an inclination angle relative to the first sub-direction, of a direction from the first connection part to the second connection part, and $\Delta l_f$ is an amount of deformation of the negative side sub elastic part from the state not generating an elastic force, and further comprising a positive elastic mechanism which biases the movable part to the first side in the main direction relative to the fixed part and decreases the elastic force along with the displacement of the movable part to the first side in the main direction, wherein
the positive elastic mechanism includes
   a positive side main elastic part which generates an elastic force biasing the movable part relative to the fixed part and
   a positive side sub elastic part which generates an elastic force biasing the positive side main elastic part relative to the movable part in a second sub-direction crossing the main direction;
the positive side main elastic part
   includes a fourth connection part connected with respect to the fixed part and includes a portion reaching the movable part from a predetermined portion of the fixed part,
   is connected with respect to the movable part by a fifth connection part, such that, at the fifth connection part, the positive side main elastic part moves in the second sub-direction and rotates around a third axis parallel to a second rotational axis direction perpendicular to the main direction and to the second sub-direction,
   the fifth connection part being located on the opposite side to the first side in the main direction and on a third side in the second sub-direction relative to the predetermined portion of the fixed part, and
   has a positive spring characteristic generating an elastic force countering separation of the predetermined portion of the fixed part and the fifth connection part;
the positive side sub elastic part
   is connected to the movable part by a sixth connection part,
   is connected to the fifth connection part of the positive side main elastic part, and
   has a positive spring characteristic generating an elastic force countering displacement of the fifth connection part of the positive side main elastic part to the opposite side to the third side in the second sub-direction,
the second sub-direction is perpendicular to the main direction, and
the elastic mechanism is configured such that the following equations $$K_{PI}=k_{PS}\times\Delta l_{P0}/l_{Pc},$$

$$\Delta l_{PI}=l_{PC}\times\cos\theta_{Pc}, \text{ and}$$

$$k_{PS}\times\Delta l_{P0}/l_{Pc}=k_S\times\Delta l_0/l_c$$

stand under the following definitions:
   $k_{PS}$ is a spring constant of the positive side main elastic part,
   $K_{PI}$ is a spring constant of the positive side sub elastic part,
   in a state where the elastic force in the second sub-direction of the positive side main elastic part and the elastic force in the second sub-direction of the positive side sub elastic part are balanced,
      in the positive side main elastic part,
         $l_{Pc}$ is a length from the predetermined portion of the fixed part to the fifth connection part,
         $\Delta l_{P0}$ is an elongation from a state not generating an elastic force, and
         $\theta_{Pc}$ is an inclination angle relative to the second sub-direction, of a direction from the predetermined portion of the fixed part to the fifth connection part, and $\Delta l_{PI}$ is an amount of deformation of the positive side sub elastic part from the state not generating an elastic force.

6. An elastic mechanism, comprising:
a fixed part,
a movable part movable in a predetermined main direction relative to the fixed part, and
a negative elastic mechanism which generates an elastic force biasing the movable part to a first side in the main direction relative to the fixed part and increasing the elastic force along with displacement of the movable part to the first side in the main direction, wherein
the negative elastic mechanism includes
   a negative side main elastic part which generates an elastic force biasing the movable part relative to the fixed part and
   a negative side sub elastic part which generates an elastic force biasing the negative side main elastic part relative to the movable part in a first sub-direction crossing the main direction, wherein
the negative side main elastic part
   is connected with respect to the fixed part by a first connection part, such that, at the first connection part, the first connection part rotates around a first axis parallel to a first rotational axis direction perpendicular to the main direction and to the first sub-direction,
   is connected with respect to the movable part by a second connection part, such that, at the second connection part, the negative side main elastic part moves in the first sub-direction and rotates around a second axis parallel to the first rotational axis direction,
   the second connection part being located on the first side in the main direction and on a second side in the first sub-direction relative to the first connection part, and
   has a positive spring characteristic generating an elastic force countering-approach of the second connection part and the first connection part; and
the negative side sub elastic part
   is connected to the movable part by a third connection part,
   is connected to the second connection part of the negative side main elastic part, and
   has a positive spring characteristic generating an elastic force countering displacement of the second connection part of the negative side main elastic part to the second side in the first sub-direction,
wherein
the first sub-direction is perpendicular to the main direction, and
the elastic mechanism is configured such that the following equations $K_I=k_S\times\Delta l_0/l_c$ and $\Delta l_I=l_c\times\cos\theta_c$ stand under the following definitions:
   $k_S$ is a spring constant of the negative side main elastic part,
   $K_I$ is a spring constant of the negative side sub elastic part,
   in a state where the elastic force in the first sub-direction of the negative side main elastic part and the elastic force in the first sub-direction of the negative side sub elastic part are balanced,
      in the negative side main elastic part,
         $l_c$ is a length from the first connection part to the second connection part, $\Delta l_O$ is a contraction from a state not generating an elastic force, and $\theta_c$ is an inclination angle relative to the first sub-direction, of a direction from the first connection part to the second connection part, and $\Delta l_I$ is an amount of deformation of the negative side sub elastic part from the state not generating an elastic force, and further comprising a positive elastic mechanism which biases the movable part to the first side in the main direction relative to the fixed part and decreases the elastic force along with the displacement of the movable part to the first side in the main direction, wherein the positive elastic mechanism includes a positive side main elastic part which generates an elastic force biasing the movable part relative to the fixed part and a positive side sub elastic part which generates an elastic force biasing the positive side main elastic part relative to the movable part in a second sub-direction crossing the main direction;

the positive side main elastic part includes a fourth connection part connected with respect to the fixed part and includes a portion reaching the movable part from a predetermined portion of the fixed part, is connected with respect to the movable part by a fifth connection part, such that, at the fifth connection part, the positive side main elastic part moves in the second sub-direction and rotates around a third axis parallel to a second rotational axis direction perpendicular to the main direction and to the second sub-direction, the fifth connection part being located on the opposite side to the first side in the main direction and on a third side in the second sub-direction relative to the predetermined portion of the fixed part, and has a positive spring characteristic generating an elastic force countering separation of the predetermined portion of the fixed part and the fifth connection part;

the positive side sub elastic part is connected to the movable part by a sixth connection part, is connected to the fifth connection part of the positive side main elastic part, and has a positive spring characteristic generating an elastic force countering displacement of the fifth connection part of the positive side main elastic part to the opposite side to the third side in the second sub-direction, the second sub-direction is perpendicular to the main direction, and the elastic mechanism is configured such that the following equations $K_{PI} = k_{PS} \times \Delta l_{P0} / l_{PC}$, $\Delta l_{PI} = l_{PC} \times \cos \theta_{Pc}$, and $k_{PS} \times \Delta l_{P0} / l_{Pc} \neq k_S \times \Delta l_O / l_c$ stand under the following definitions:

$k_{PS}$ is the spring constant of the positive side main elastic part, $K_{PI}$ is the spring constant of the positive side sub elastic part, in a state where the elastic force in the second sub-direction of the positive side main elastic part and the elastic force in the second sub-direction of the positive side sub elastic part are balanced, in the positive side main elastic part, $l_{Pc}$ is a length from the predetermined portion of the fixed part to the fifth connection part, $\Delta l_{P0}$ is an elongation from a state not generating an elastic force, and $\theta_{Pc}$ is an inclination angle relative to the second sub-direction, of a direction from the predetermined portion of the fixed part to the fifth connection part and $\Delta l_{PI}$ is an amount of deformation of the positive side sub elastic part from the state not generating an elastic force.

\* \* \* \* \*